United States Patent
Sahraei et al.

(10) Patent No.: US 11,424,973 B2
(45) Date of Patent: *Aug. 23, 2022

(54) TONE RESERVATION FOR PEAK TO AVERAGE POWER RATIO REDUCTION

(71) Applicant: QUALCOMM Incorporated, San Diego, CA (US)

(72) Inventors: Saeid Sahraei, San Diego, CA (US); Gokul Sridharan, Sunnyvale, CA (US); Hung Dinh Ly, San Diego, CA (US); June Namgoong, San Diego, CA (US); Krishna Kiran Mukkavilli, San Diego, CA (US); Naga Bhushan, San Diego, CA (US); Tingfang Ji, San Diego, CA (US); Peter Gaal, San Diego, CA (US); Taesang Yoo, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,759

(22) Filed: May 3, 2021

(65) Prior Publication Data

US 2021/0344536 A1 Nov. 4, 2021

Related U.S. Application Data

(60) Provisional application No. 63/019,802, filed on May 4, 2020, provisional application No. 63/019,794, filed on May 4, 2020.

(51) Int. Cl.
*H04L 27/26* (2006.01)

(52) U.S. Cl.
CPC ........ *H04L 27/262* (2013.01); *H04L 27/2602* (2013.01); *H04L 27/2615* (2013.01); *H04L 27/2621* (2013.01)

(58) Field of Classification Search
CPC ............. H04L 27/2602; H04L 27/2615; H04L 27/2618; H04L 27/262; H04L 27/2621;
(Continued)

(56) References Cited

U.S. PATENT DOCUMENTS

2007/0242598 A1 10/2007 Kowalski
2008/0298490 A1* 12/2008 Yun ..................... H04L 27/2618
375/260

(Continued)

OTHER PUBLICATIONS

International Search Report and Written Opinion—PCT/US2021/030706—ISA/EPO—dated Aug. 3, 2021.

*Primary Examiner* — David S Huang
(74) *Attorney, Agent, or Firm* — Harrity & Harrity, LLP

(57) ABSTRACT

Various aspects of the present disclosure generally relate to wireless communication. In some aspects, a user equipment may receive a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs arranged relative to a plurality of contiguous data tones or a pseudo-random pattern generated using a pseudo-random number generator; and transmit a data transmission using a waveform based at least in part on the resource allocation. Numerous other aspects are provided.

30 Claims, 8 Drawing Sheets

(58) Field of Classification Search
CPC ... H04L 5/0007; H04L 27/2614; H04L 5/001; H04L 5/0048; H04L 5/0094
See application file for complete search history.

(56) References Cited

U.S. PATENT DOCUMENTS

2010/0080113 A1    4/2010  Yang et al.
2021/0344544 A1*  11/2021  Sahraei ............. H04W 72/0453

* cited by examiner

500

510 — Receive a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator 520 — Transmit a data transmission using a waveform based at least in part on the resource allocation

FIG. 5

TONE RESERVATION FOR PEAK TO AVERAGE POWER RATIO REDUCTION

CROSS-REFERENCE TO RELATED APPLICATION

This patent application claims priority to U.S. Provisional Patent Application No. 63/019,794, filed on May 4, 2020, entitled "TONE RESERVATION FOR PEAK TO AVERAGE POWER RATIO REDUCTION," and to U.S. Provisional Patent Application No. 63/019,802, filed on May 4, 2020, entitled "TONE RESERVATION FOR PEAK TO AVERAGE POWER RATIO REDUCTION," each of which is assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for tone reservation for peak to average power ratio reduction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern; and transmitting a data transmission using a waveform based at least in part on the resource allocation.

In some aspects, a method of wireless communication, performed by a base station, may include transmitting a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and receiving a data transmission comprising a waveform based at least in part on the resource allocation.

In some aspects, a UE for wireless communication may include memory; one or more processors coupled to the memory; and instructions stored in the memory. The instructions in the memory may be operable, when executed by the one or more processors, to cause the UE to receive a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and transmit a data transmission using a waveform based at least in part on the resource allocation.

In some aspects, a base station for wireless communication may include memory; one or more processors coupled to the memory; and instructions stored in the memory. The instructions in the memory may be operable, when executed by the one or more processors, to cause the base station to transmit a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and receive a data transmission comprising a waveform based at least in part on the resource allocation.

In some aspects, a non-transitory computer-readable medium may store one or more instructions for wireless communication that, when executed by one or more processors of a UE, may cause the UE to receive a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and transmit a data transmission using a waveform based at least in part on the resource allocation.

In some aspects, a non-transitory computer-readable medium may store one or more instructions for wireless communication that, when executed by one or more processors of a base station, may cause the base station to transmit a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and receive a data transmission comprising a waveform based at least in part on the resource allocation.

In some aspects, an apparatus for wireless communication may include means for receiving a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and means for transmitting a data transmission using a waveform based at least in part on the resource allocation.

In some aspects, an apparatus for wireless communication may include means for transmitting a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and means for receiving a data transmission comprising a waveform based at least in part on the resource allocation.

In some aspects, a method of wireless communication, performed by a UE, may include receiving a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones, and wherein the PRT sequence comprises a plurality of contiguous PRTs of the set of PRTs arranged relative to a plurality of contiguous data tones of the set of data tones; and transmitting a data transmission using a waveform based at least in part on the resource allocation.

In some aspects, a method of wireless communication, performed by a base station, may include transmitting a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and receiving a data transmission comprising a waveform based at least in part on the resource allocation.

In some aspects, a UE for wireless communication may include memory; one or more processors coupled to the memory; and instructions stored in the memory. The instructions in the memory may be operable, when executed by the one or more processors, to cause the UE to receive a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and transmit a data transmission using a waveform based at least in part on the resource allocation.

In some aspects, a base station for wireless communication may include memory; one or more processors coupled to the memory; and instructions stored in the memory. The instructions in the memory may be operable, when executed by the one or more processors, to cause the base station to transmit a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the set of data tone locations according to a PRT sequence, and wherein the PRT sequence comprises a plurality of contiguous PRTs of the set of PRTs arranged relative to a plurality of contiguous data tones of the set of data tones; and receive a data transmission comprising a waveform based at least in part on the resource allocation.

In some aspects, a non-transitory computer-readable medium may store one or more instructions for wireless communication that, when executed by one or more processors of a UE, may cause the UE to receive a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and transmit a data transmission using a waveform based at least in part on the resource allocation.

In some aspects, a non-transitory computer-readable medium may store one or more instructions for wireless communication that, when executed by one or more processors of a base station, may cause the base station to transmit a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and receive a data transmission comprising a waveform based at least in part on the resource allocation.

In some aspects, an apparatus for wireless communication may include means for receiving a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones, and wherein the PRT sequence comprises a plurality of contiguous PRTs of the set of PRTs arranged relative to a plurality of contiguous data tones of the set of data tones; and means for transmitting a data transmission using a waveform based at least in part on the resource allocation.

In some aspects, an apparatus for wireless communication may include means for transmitting a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and means for receiving a data transmission comprising a waveform based at least in part on the resource allocation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a user equipment, in accordance with the present disclosure.

DETAILED DESCRIPTION

Figure 1:
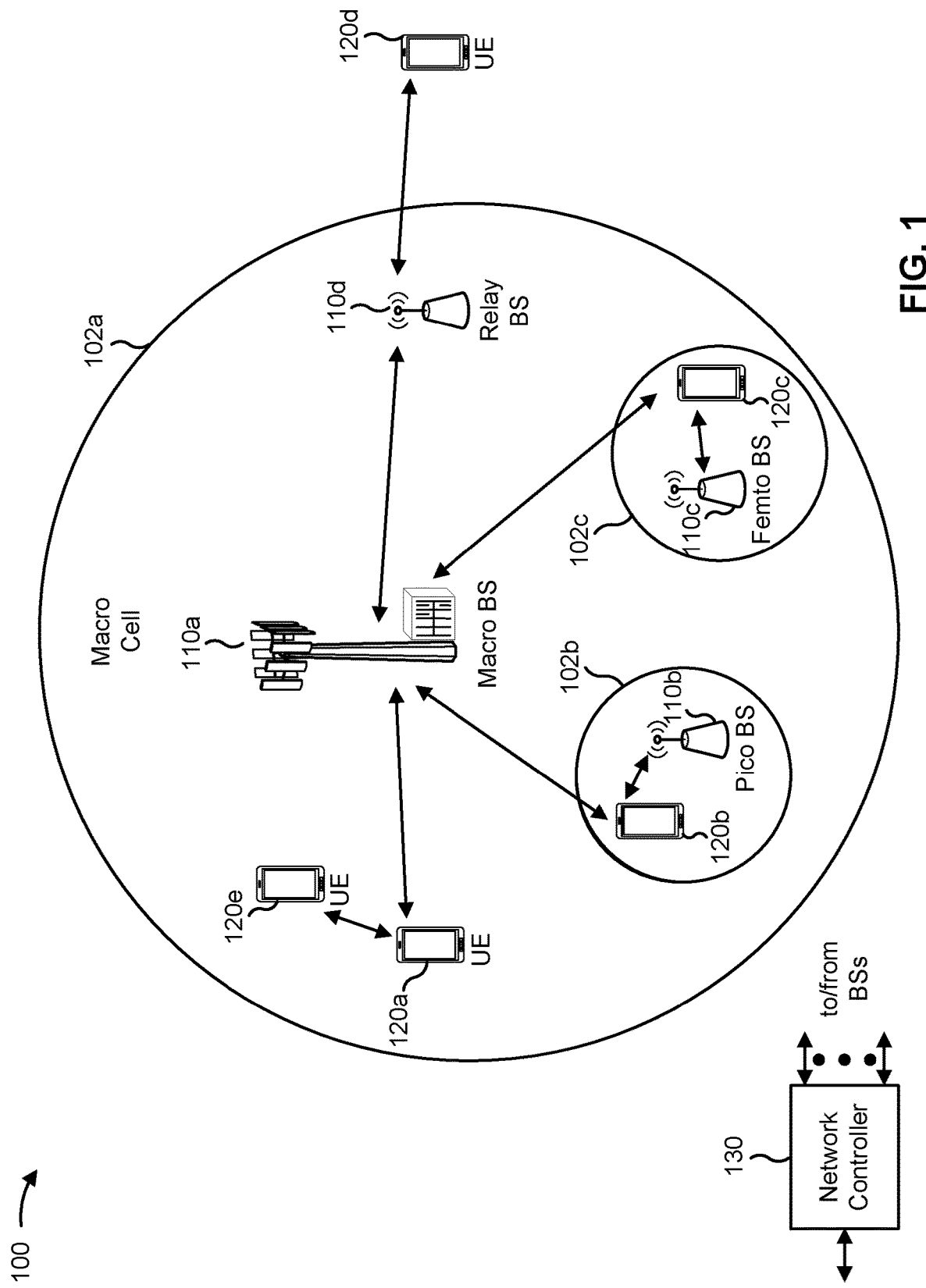
FIG. 1 is a diagram illustrating an example of a wireless network, in accordance with the present disclosure.

Typical methods for peak reduction tone (PRT) selection for reducing peak to average power ratio (PAPR) in a power amplifier of a user equipment (UE) using an orthogonal frequency division multiplexing (OFDM) signal may introduce unnecessary processing that may create a reduction in performance. Additionally, the selection of the PRTs may not be known by the base station, and thus would need to be signaled to the base station to facilitate decoding by the base station, thereby increasing signaling overhead. Aspects of techniques and apparatuses described herein may facilitate PRT reservation for reducing PAPR of a power amplifier in a user equipment (UE). In some aspects, tone reservation techniques described herein may facilitate PRT location determination based on established patterns, sequences, tables, and/or the like. In some aspects, a PRT sequence may include a pseudo-random pattern generated using a pseudo-random number generator. In some aspects, a PRT sequence may include at least one plurality of contiguous PRTs and at least one plurality of contiguous data tones. A base station may indicate, to the UE, the PRT sequence, the pseudo-random number generator, a seed associated with the pseudo-random number generator, and/or the like. In this way, PRT location may be determined without optimizing random PRT index selection in real time, thereby reducing the complexity of the transmitter's operation. This may facilitate savings in power and time during transmission, thereby improving performance, reducing computational burden, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
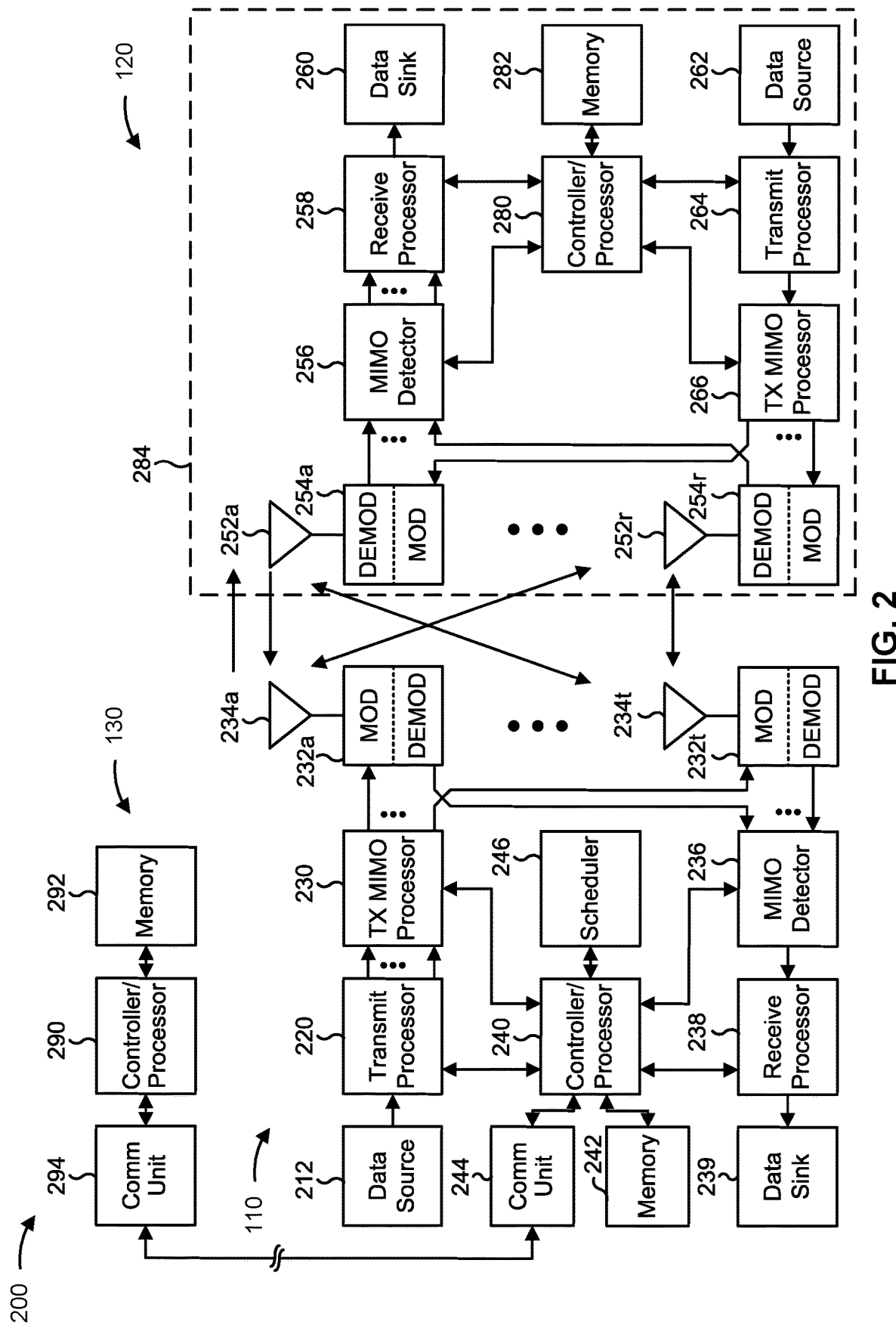
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3 and 4).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3 and 4).

Controller/processor 240 of base station 110, controller/processor 280 of UE 120, and/or any other component(s) of FIG. 2 may perform one or more techniques associated with tone reservation for PAPR reduction, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example processes as described herein. In some aspects, executing instructions may include running the instructions, converting the instructions, compiling the instructions, and/or interpreting the instructions, among other examples.

Figure 6:
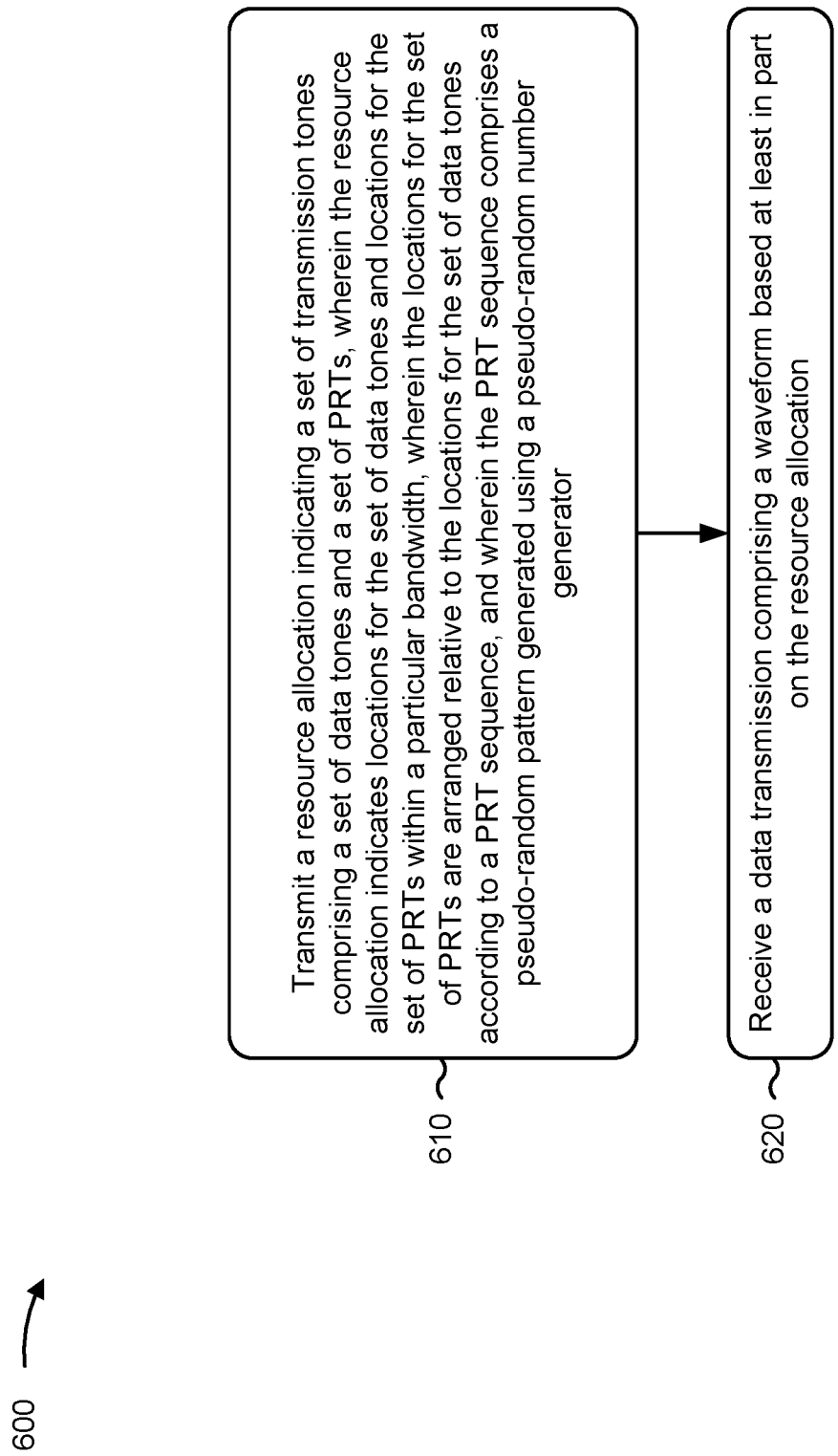
FIG. 6 is a diagram illustrating an example process performed, for example, by a base station, in accordance with the present disclosure.
Figure 7:
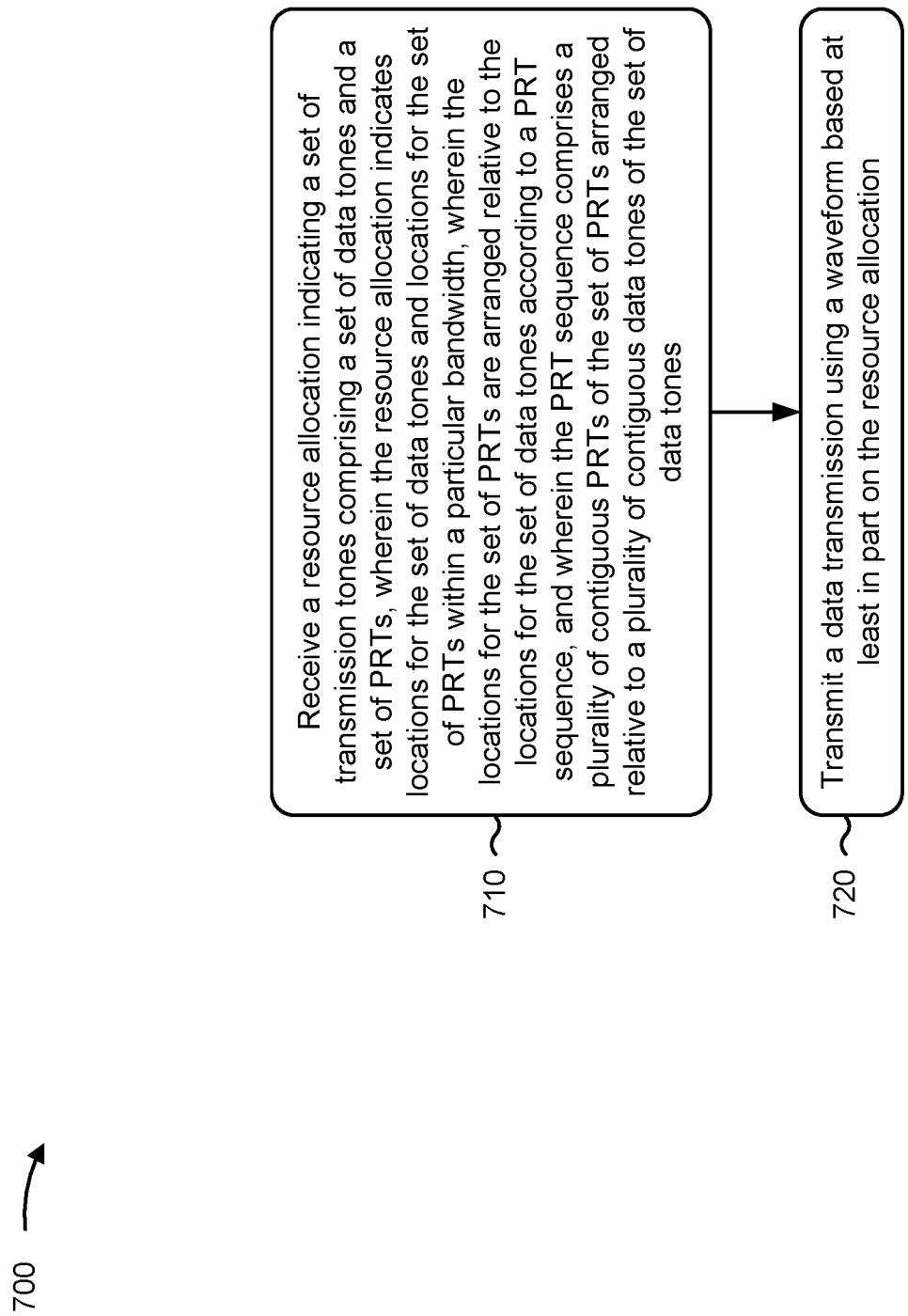
FIG. 7 is a diagram illustrating an example process performed, for example, by a user equipment, in accordance with the present disclosure.

The stored program codes, when executed by processor 280 and/or other processors and modules at UE 120, may cause the UE 120 to perform operations described with respect to process 500 of FIG. 5, process 700 of FIG. 7, and/or other processes as described herein. The stored program codes, when executed by processor 240 and/or other processors and modules at base station 110, may cause the base station 110 to perform operations described with respect to process 600 of FIG. 6, process 800 of FIG. 8, and/or other processes as described herein. A scheduler 246 may schedule UEs for data transmission on the downlink and/or uplink.

In some aspects, UE 120 may include means for receiving a resource allocation indicating a set of transmission tones comprising a set of data tones and a set of peak reduction tones (PRTs), wherein the set of data tones indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator, means for transmitting a data transmission using a waveform based at least in part on the resource allocation, and/or the like. In some aspects, such means may include one or more components of UE 120 described in connection with FIG. 2.

In some aspects, base station 110 may include means for transmitting a resource allocation indicating a set of transmission tones comprising a set of data tones and a set of PRTs, wherein the set of data tones indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator, means for receiving a data transmission comprising a waveform based at least in part on the resource allocation, and/or the like. In some aspects, such means may include one or more components of base station 110 described in connection with FIG. 2.

In some aspects, UE 120 may include means for receiving a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones, means for transmitting a data transmission using a waveform based at least in part on the resource allocation, and/or the like. In some aspects, such means may include one or more components of UE 120 described in connection with FIG. 2.

In some aspects, base station 110 may include means for transmitting a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones, means for receiving a data transmission comprising a waveform based at least in part on the resource allocation, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Commercial power amplifiers typically have a non-linear behavior if operated at high input power. This non-linearity may result in in-band and out-of-band distortion of the signal, and degraded error vector magnitude (EVM) at a receiver of the signal. To avoid non-linearity, the power amplifier may be operated at a mean input power that is several dB lower than the saturation point. An appropriate power level may be determined by determining an input power that maintains a peak to average power ratio (PAPR) of the signal below a certain level.

Orthogonal frequency division multiplexing (OFDM) signals are known to suffer from significant PAPR that grows rapidly by the size of the frequency block. 5G NR is being developed to support higher data rates than LTE. Thus, 5G NR OFDM block sizes may be larger than LTE block sizes, thereby further increasing PAPR of signals. Some PAPR reduction techniques may be data-dependent and computationally expensive, making them unfit for a real-time implementation in the context of a 5G NR transmitter. As a result, clipping and filtering (CF) is often used in the industry. CF results in in-band distortion and often does not converge to a desirable solution.

5G NR provides an abundance of bandwidth both in the uplink and downlink. This is true both due to the addition of Frequency Range 2 (FR2) in 5G NR as well as an increase in the available bandwidth to 100 MHz in the Sub-6 GHz frequency range. This excess bandwidth is partially exploited by using longer OFDM symbols, which further increases the PAPR for OFDM. The excess bandwidth may also be exploited for PAPR reduction via a technique known as tone reservation.

Tone reservation may allow a transmitter to utilize some of the otherwise-idle tones for reducing the PAPR of an OFDM signal. The magnitude and the phase of the reserved tones may be optimized for a given OFDM symbol to minimize the PAPR of the associated signal. In some cases, there may be no overlap between the data tones and reserved tones. In this way, tone reservation may be used without introducing any EVM or adjacent channel leakage ratio. The receiver may simply ignore the portion of the signal associated with the reserved tones and only decode the portion of the signal associated with the data tones.

Tone reservation may be performed by determining PRTs that are configured to reduce peaks of the resulting OFDM signal so that the PAPR of the resulting signal satisfies a threshold. PRTs may be generated using a signal to clipping noise ratio tone reservation (SCR-TR) algorithm. The SCR-TR algorithm may be used to optimize the value of PRT tones based at least in part on their locations.

A UE may be allocated a set of N transmission tones having a corresponding set of tone location indices, $\{1, \ldots, N\}$. If $\Phi$ is a subset of $\{1, \ldots, N\}$ corresponding to the PRT locations, the remaining transmission tone locations may be allocated to data tones, having a subset, $\{1, \ldots, N\}\backslash\Phi$, of tone location indices. A frequency domain kernel, P may be constructed such that:

$$P_i = \begin{cases} 1 & \text{if} \quad i \in \Phi \\ 0 & \text{if} \quad i \in [N]\backslash\Phi \end{cases}$$

and p=iDFT(P). X may be the frequency domain data. Thus, $X_i=0$, if $i\in\Phi$ and x=iDFT(X).

According to the SCR-TR algorithm, the location of the largest peak of x is identified, and the index thereof represented by $j\in[EV]$, where L is the oversampling factor. The SCR-TR includes circularly shifting p, p$^j$=circshift(p,j), so that the peaks are aligned. The SCR-TR further includes subtracting the scaled and shifted p from x to obtain:

$$x_{new} = x - \frac{|x(j)| - \mu}{p(0)} p_j e^{i<x(j)},$$

where $\mu$ is the target peak, $<x(j)$ is the phase of $x(j)$, $i=\sqrt{-1}$. This process is iterated several times to reduce several peaks. The time-domain kernel p has a single prominent and narrow peak if the number of reserved tones is sufficiently large and the locations are chosen properly. Additionally, circularly shifting p in the time-domain does not impact the location of PRTs in the frequency domain—it only disturbs their phase.

In some cases, PRT location selection may be performed by randomly selecting a set of PRT indices representing PRT locations along the frequency spectrum of the frequency domain, generating an OFDM signal based on the PRTs and the data tones, and determining whether the PAPR of the resulting signal satisfies a PAPR threshold. However, due to the random nature of the PRT selection for each iteration, these methods may introduce unnecessary processing that may create a reduction in performance. Additionally, the selection of the PRTs may not be known by the base station, and thus would need to be signaled to the base station to facilitate decoding by the base station, thereby increasing signaling overhead.

Aspects of techniques and apparatuses described herein may facilitate PRT reservation for reducing PAPR of a power amplifier in a UE. In some aspects, tone reservation techniques described herein may facilitate PRT location determination based on established patterns, sequences, tables, and/or the like. In this way, PRT location may be determined without optimizing random PRT index selection in real time, thereby reducing the complexity of the transmitter's operation. This may facilitate savings in power and time during transmission, thereby improving performance, reducing computational burden, and/or the like.

In some aspects, a base station may allocate a set of transmission tones comprising a set of data tones and a set of PRTs to a UE. The set of transmission tones may indicate locations for the set of PRTs (a collection of which may be referred to as a set of PRT locations) arranged relative to locations for the set of data tones (a collection of which may be referred to as a set of data tone locations) according to a PRT sequence. In some aspects, the PRT sequence may include a pseudo-random pattern generated using a pseudo-random number generator. The pseudo-random number generator may include a linear congruential generator, a Costas array, a maximum length sequence, a Gold sequence, a Golomb Ruler, and/or the like. In some aspects, the PRT sequence may include a plurality of contiguous PRTs arranged relative to a plurality of contiguous data tones.

By utilizing a simple pseudo-random number generator already used for other applications related to 5G NR or by using a plurality of contiguous PRTs arranged relative to a plurality of contiguous data tones, aspects of the invention described herein provide a simple PRT selection that facilitates PRT location determination with little processing overhead, signaling overhead, additional programming, and/or the like. Additionally, using a pseudo-random number generator results in a kernel with a single narrow peak, and thus does not have wide lobes or periodic peaks. In some aspects, the set of transmission tones may include discrete Fourier transform spread spectrum-OFDM (DFT-s-OFDM) waveforms. In some aspects, the set of transmission tones may include cyclic prefix-OFDM (CP-OFDM) waveforms (e.g., when some performance may be traded for low signaling overhead).

Figure 3:
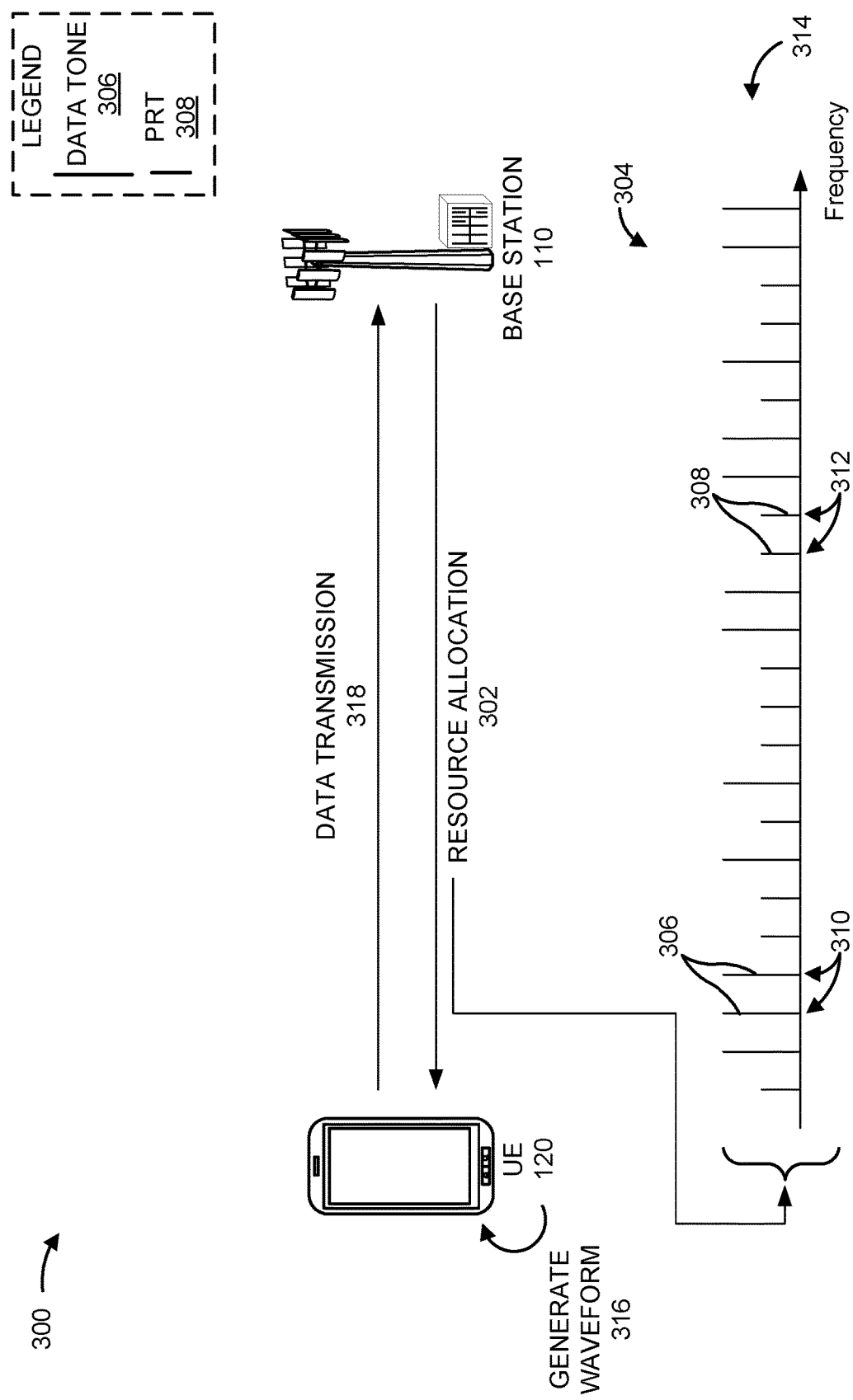
FIGS. 3 and 4 are diagrams illustrating examples of tone reservation for peak to average power ratio reduction, in accordance with the present disclosure.

FIG. 3 is a diagram illustrating an example 300 of tone reservation for peak to average power ratio reduction, in accordance with the present disclosure. As shown, a base station 110 and a UE 120 may communicate with one another.

As shown by reference number 302, the base station 110 may transmit, and the UE 120 may receive, a resource allocation. In some aspects, the resource allocation may be carried in downlink control information (DCI), a radio resource control (RRC) message, a medium access control (MAC)-control element (CE), and/or the like. The resource allocation may indicate a set of transmission tones. The set 304 of transmission tones may include a set of data tones 306 (shown by the longer vertical bars) and a set of PRTs 308 (shown by the shorter vertical bars). resource allocation may indicate a set of data tone locations 310 within a particular bandwidth (shown as "BW"). The resource allocation may indicate a set of PRT locations 312 within the particular bandwidth.

In some aspects, the locations for the set of PRTs (the set of PRT locations) 312 may be arranged relative to the locations for the set of data tones (the set of data tone locations) 310 according to a PRT sequence 314. As shown, the PRT sequence 314 may include PRTs 308 interleaved with data tones 306. In some aspects, the PRT sequence 314 may include a pseudo-random pattern. In some aspects, the pseudo-random pattern may be generated using a pseudo-random number generator. The pseudo-random number generator may include a linear congruential generator, a Costas array, a maximum length sequence, a Gold sequence, and/or the like.

In some aspects, the resource allocation may indicate the PRT sequence 314 by referencing a PRT table (PRTT). In some aspects, the PRTT may indicate a plurality of PRT sequences. In some aspects, the resource allocation may indicate a set of RBs, and the UE 120 may determine, using the PRTT, the PRT sequence 314 based at least in part on a quantity of RBs in the set of RBs.

In some aspects, the PRTT may include a plurality of entries. An entry of the plurality of entries may include the PRT sequence 314, one or more parameters of the pseudo-random number generator, and/or the like. In some aspects, the plurality of entries may indicate a plurality of pseudo-random sequences. Each entry of the plurality of entries may correspond to a respective pseudo-random sequence of the plurality of pseudo-random sequences. In some aspects, each entry may indicate an offset associated with the respective pseudo-random sequence, a length associated with the respective pseudo-random sequence, and/or the like. In some aspects, each pseudo-random sequence of the plurality of pseudo-random sequences may correspond to a set of RBs allocated to the UE, a ratio of a quantity of PRTs 308 in the set of PRTs 308 to a quantity of data tones 306 in the set of data tones 306, and/or the like.

In some aspects, the resource allocation may indicate the PRT sequence 314 by indicating the pseudo-random number generator for determining the PRT sequence 314. In some aspects, the pseudo-random number generator may comprise a seed. In some aspects, the resource allocation may indicate the seed. In some aspects, the resource allocation may indicate one or more parameter values associated with one or more parameters of the pseudo-random number generator. In some aspects, a density of the PRTs 308 of the set of PRTs 308 may be based at least in part on the one or more parameters of the pseudo-random number generator, available bandwidth resources, and/or the like.

As shown by reference number 316, the UE 120 may generate the waveform based at least in part on the resource allocation. In some aspects, the UE 120 may generate the waveform by determining an inverse discrete Fourier transform of the set of transmission tones. In some aspects, the waveform may include a CP-OFDM waveform. In some aspects, the waveform may include a DFT-s-OFDM waveform. In some aspects, the set of PRTs may be selected such that a PAPR associated with the waveform satisfies a PAPR threshold.

As shown by reference number 318, the UE 120 may transmit, and the base station 110 may receive, a data transmission using the waveform.

As indicated above, FIG. 3 is provided as an example. Other examples may differ from what is described with respect to FIG. 3.

Figure 4:
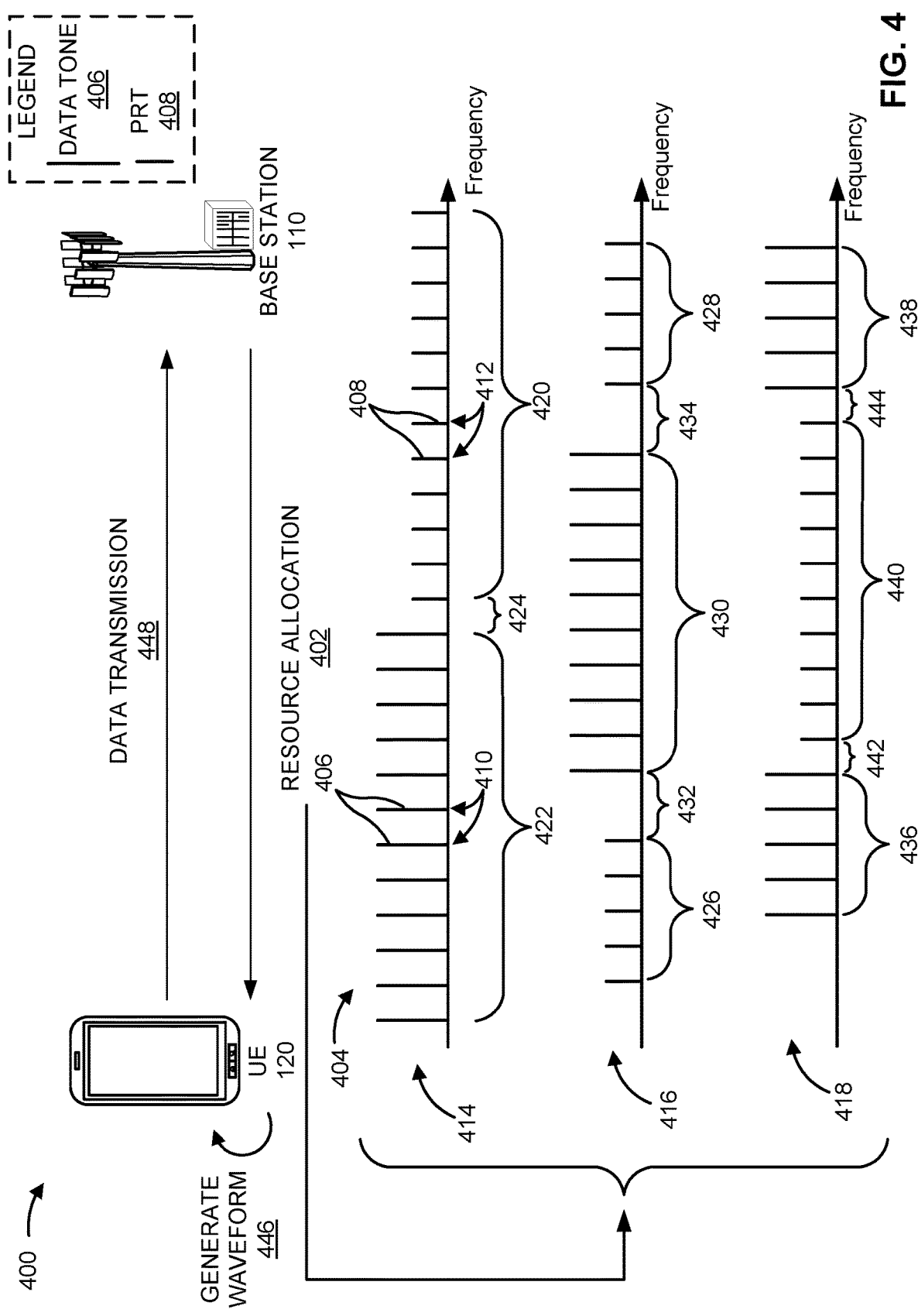

FIG. 4 is a diagram illustrating an example 400 of tone reservation for peak to average power ratio reduction, in accordance with the present disclosure. As shown, a base station 110 and a UE 120 may communicate with one another.

As shown by reference number 402, the base station 110 may transmit, and the UE 120 may receive, a resource allocation. In some aspects, the resource allocation may be carried in downlink control information (DCI), a radio resource control (RRC) message, a medium access control (MAC) control element (MAC-CE), and/or the like. The resource allocation may indicate a set of transmission tones 404. The set of transmission tones 404 may include a set of data tones 406 (shown by the longer vertical bars) and a set of PRTs 408 (shown by the shorter vertical bars). The resource allocation may indicate a set of data tone locations 410 along a frequency spectrum within a particular bandwidth (shown as "BW"). The resource allocation may indicate a set of PRT locations 412 along the frequency spectrum within the particular bandwidth.

In some aspects, the set of PRT locations 412 may be arranged relative to the set of data tone locations 410 according to a PRT sequence 414, 416, and/or 418. In some aspects, the PRT sequence 414, 416, and/or 418 may include a plurality 420 of contiguous PRTs 408 of the set of PRTs 408 arranged relative to a plurality 422 of contiguous data tones 406 of the set of data tones 406. As shown by the PRT sequence 414, the plurality 420 of contiguous PRTs 408 may include the set of PRTs 408, and the plurality 422 of contiguous data tones 406 may include the set of data tones 406. The plurality 420 of contiguous PRTs 408 may be arranged, along a frequency spectrum of a frequency dimension, on a first side of the set of data tones 406 or a second side of the set of data tones 406.

The plurality 420 of contiguous PRTs 408 may have a PRT group length that indicates the quantity of PRTs 408 in the plurality 420 of contiguous PRTs 408. Similarly, the plurality 422 of contiguous data tones 406 may have a data tone group length that indicates the quantity of data tones 406 in the plurality 422 of contiguous data tones 406. In some aspects, the resource allocation may indicate a location of the plurality 420 of contiguous PRTs 408 relative to a location of the plurality 422 of contiguous data tones 406, the PRT group length, the data tone group length, and/or the like.

In some aspects, the PRT sequence 414, 416, and/or 418 may include a frequency gap 424 disposed between the plurality 420 of contiguous PRTs 408 and the plurality 422 of contiguous data tones 406. The frequency gap may have a gap length corresponding to a frequency range. In some aspects, the resource allocation may indicate a location of the frequency gap 424 relative to at least one of a location of the plurality 420 of contiguous PRTs 408, a location of the plurality 422 of contiguous data tones 406, or a combination thereof, the gap length, and/or the like. In some aspects, the resource allocation may indicate a plurality of resource blocks (RBs), and an initial RB of the plurality of RBs may include a starting RB of the frequency gap 424.

In some aspects, as shown by the PRT sequence 416, the set of PRTs 408 may include a first plurality 426 of contiguous PRTs 408 and a second plurality 428 of contiguous PRTs 408. As shown, the PRT sequence 416 may include a plurality 430 of contiguous data tones 406 that may include the set of data tones 406. The first plurality 426 of contiguous PRTs 408 may be arranged on a first side of the plurality 430 of contiguous data tones 406, and the second plurality 428 of contiguous PRTs 408 may be arranged on a second side of the plurality 430 of contiguous data tones 406.

The first plurality 426 of contiguous PRTs 408 may have a first PRT group length, and the second plurality 428 of contiguous PRTs 408 may have a second PRT group length. In some aspects, the first PRT group length may be equal to the second PRT group length. In some aspects, the first PRT group length may not be equal to the second PRT group length. In some aspects, the resource allocation may indicate a location of the first plurality 426 of contiguous PRTs 408 relative to a location of the plurality 430 of contiguous data tones 406, a location of the second plurality 428 of contiguous PRTs 408 relative to the location of the plurality 430 of contiguous data tones 406, the first PRT group length, the second PRT group length, and/or the like.

As shown, the PRT sequence 416 may include a first frequency gap 432 between the first plurality 426 of contiguous PRTs 408 and the plurality 430 of contiguous data tones 406. In some aspects, the PRT sequence 416 may include a second frequency gap 434 between the plurality 430 of contiguous data tones 406 and the second plurality 428 of contiguous PRTs 408. The first frequency gap 432 may have a first gap length corresponding to a first frequency range, and the second frequency gap 434 may have a second gap length corresponding to a second frequency range. In some aspects, the first gap length may be equal to the second gap length. In some aspects, the first gap length may not be equal to the second gap length.

In some aspects, the resource allocation may indicate at least one of a location of the first frequency gap 432 relative to a location of the first plurality 426 of contiguous PRTs 408, a location of the plurality 430 of contiguous data tones 406, or a combination thereof, a location of the second frequency gap 434 relative to a location of the second plurality 428 of contiguous PRTs 408, the location of the plurality 430 of contiguous data tones 406, or a combination thereof, the first gap length, the second gap length, and/or the like. In some aspects, the resource allocation indicates a plurality of RBs, and an initial RB of the plurality of RBs may include a starting RB of the first frequency gap 432 and/or a starting RB of the second frequency gap 434.

As shown by PRT sequence 418, the set of data tones may include a first plurality 436 of contiguous data tones 406 and a second plurality 438 of contiguous data tones 406. In some aspects, the PRT sequence 418 may include a plurality 440 of contiguous PRTs 408 that includes the set of PRTs 408. In some aspects, the first plurality 436 of contiguous data tones 406 may be arranged on a first side of the plurality 440 of contiguous PRTs 408, and the second plurality 438 of contiguous data tones 406 may be arranged on a second side of the plurality 440 of contiguous PRTs 408.

The first plurality 436 of contiguous data tones 406 may have a first data tone group length, and the second plurality 438 of contiguous data tones 406 may have a second data tone group length. In some aspects, the first data tone group length may be equal to the second data tone group length. In some aspects, the first data tone group length may not be equal to the second data tone group length. In some aspects, the resource allocation may indicate a location of the first plurality 436 of contiguous data tones 406 relative to a location of the plurality 440 of contiguous PRTs 408, a location of the second plurality 438 of contiguous data tones 406 relative to the location of the plurality 440 of contiguous PRTs 408, the first data tone group length, the second data tone group length, and/or the like.

In some aspects, the PRT sequence 418 may include a first frequency gap 442 between the first plurality 436 of contiguous data tones 406 and the plurality 440 of contiguous PRTs 408. The PRT sequence 418 may include a second frequency gap 444 between the plurality 440 of contiguous PRTs 408 and the second plurality 438 of contiguous data tones 406. In some aspects, the first frequency gap 442 may have a first gap length corresponding to a first frequency range, and the second frequency gap 444 may have a second gap length corresponding to a second frequency range. In some aspects, the first gap length may be equal to the second gap length. In some aspects, the first gap length may not be equal to the second gap length.

In some aspects, the resource allocation may indicate a location of the first frequency gap 442 relative to a location of the first plurality 436 of contiguous data tones 406, a location of the plurality 440 of contiguous PRTs 408, or a combination thereof, a location of the second frequency gap 444 relative to a location of the second plurality 438 of contiguous data tones 406, the location of the plurality 440 of contiguous PRTs 408, or a combination thereof, the first gap length, the second gap length, and/or the like. In some aspects, the resource allocation may indicate a plurality of RBs, and an initial RB of the plurality of RBs may include a starting RB of the first frequency gap 442 and/or a starting RB of the second frequency gap 444.

In some aspects, the resource allocation may indicate the PRT sequence by referencing a PRT table (PRTT). In some aspects, the resource allocation may indicate a set of RBs. In some aspects, the UE 120 may determine, using the PRTT, the PRT sequence based at least in part on a quantity of RBs in the set of RBs. In some aspects, the PRTT may include a plurality of entries. An entry of the plurality of entries may include the PRT sequence, one or more parameters of a deterministic function for determining the PRT sequence, a starting index associated with the PRT sequence, an ending index associated with the PRT sequence, and/or the like.

In some aspects, the resource allocation may indicate the PRT sequence by indicating a deterministic function for determining the PRT sequence. In some aspects, the deterministic function may include one or more flexible parameters. The base station 110 may transmit, and the UE 120 may receive, an indication of one or more parameter values corresponding to the one or more flexible parameters.

In some aspects, the resource allocation may indicate a set of PRT resources corresponding to the set of PRTs, a set of data tone resources corresponding to the set of data tones, and/or the like. In some aspects, the resource allocation may indicate a plurality of RBs, a location of the set of PRT resources relative to an initial RB of the plurality of RBs, a location of the set of data tone resources relative to the initial RB, and/or the like. In some aspects, the resource allocation may include a bit mask that indicates a location of each of one or more PRTs of the set of PRTs relative to a location of each of one or more data tones of the set of data tones.

As shown by reference number 446, the UE 120 may generate the waveform based at least in part on the resource allocation. In some aspects, the UE 120 may generate the waveform by determining an inverse discrete Fourier transform of the set of transmission tones. In some aspects, the waveform may include a CP-OFDM waveform. In some aspects, the waveform may include a DFT-s-OFDM waveform. In some aspects, the set of PRTs may be selected such that a PAPR associated with the waveform satisfies a PAPR threshold.

As shown by reference number 448, the UE 120 may transmit, and the base station 110 may receive, a data transmission using the waveform.

As indicated above, FIG. 4 is provided as an example. Other examples may differ from what is described with respect to FIG. 4.

FIG. 5 is a diagram illustrating an example process 500 performed, for example, by a UE, in accordance with the present disclosure. Example process 500 is an example where the UE (e.g., UE 120 and/or the like) performs operations associated with tone reservation for PAPR reduction.

As shown in FIG. 5, in some aspects, process 500 may include receiving a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator (block 510). For example, the UE (e.g., using receive processor 258, controller/processor 280, memory 282, and/or the like) may receive a resource allocation indicating a set of transmission tones comprising a set of data tones and a set of PRTs, as described above. In some aspects, the set of data tones indicates locations for the set of data tones and locations for the set of PRTs within a particular bandwidth. In some aspects, the locations for the set of PRTs are arranged relative to the locations for the set of data tones according to a PRT sequence. In some aspects, the PRT sequence comprises a pseudo-random pattern generated using a pseudo-random number generator.

As further shown in FIG. 5, in some aspects, process 500 may include transmitting a data transmission using a waveform based at least in part on the resource allocation (block 520). For example, the UE (e.g., using transmit processor 264, controller/processor 280, memory 282, and/or the like) may transmit a data transmission using a waveform based at least in part on the resource allocation, as described above.

Process 500 may include additional aspects, such as any single aspect or any combination of aspects described below and/or in connection with one or more other processes described elsewhere herein.

In a first aspect, process 500 includes generating the waveform by determining an inverse discrete Fourier transform of the set of transmission tones.

In a second aspect, alone or in combination with the first aspect, the waveform comprises a CP-OFDM waveform or a DFT-s-OFDM waveform.

In a third aspect, alone or in combination with one or more of the first and second aspects, the set of PRTs are selected such that a PAPR associated with the waveform satisfies a PAPR threshold.

In a fourth aspect, alone or in combination with one or more of the first through third aspects, the resource allocation indicates the PRT sequence by referencing a PRTT, wherein the PRTT indicates a plurality of PRT sequences.

In a fifth aspect, alone or in combination with one or more of the first through fourth aspects, the resource allocation indicates a set of RBs, and process 500 includes determining, using the PRTT, the PRT sequence based at least in part on a quantity of RBs in the set of RBs.

In a sixth aspect, alone or in combination with one or more of the first through fifth aspects, the PRTT comprises a plurality of entries, and an entry of the plurality of entries comprises at least one of: the PRT sequence, one or more parameters of the pseudo-random number generator, or a combination thereof.

In a seventh aspect, alone or in combination with one or more of the first through sixth aspects, the plurality of entries indicate a plurality of pseudo-random sequences.

In an eighth aspect, alone or in combination with one or more of the first through seventh aspects, each entry of the plurality of entries corresponds to a respective pseudo-random sequence of the plurality of pseudo-random sequences, and indicates at least one of: an offset associated with the respective pseudo-random sequence, a length associated with the respective pseudo-random sequence, or a combination thereof.

In a ninth aspect, alone or in combination with one or more of the first through eighth aspects, each pseudo-random sequence of the plurality of pseudo-random sequences corresponds to at least one of: a set of RBs allocated to the UE, a ratio of a quantity of PRTs in the set of PRTs to a quantity of data tones in the set of data tones, or a combination thereof.

In a tenth aspect, alone or in combination with one or more of the first through ninth aspects, the resource allocation indicates the PRT sequence by indicating the pseudo-random number generator for determining the PRT sequence.

In an eleventh aspect, alone or in combination with one or more of the first through tenth aspects, the pseudo-random number generator comprises a seed.

In a twelfth aspect, alone or in combination with one or more of the first through eleventh aspects, the resource allocation indicates the seed.

In a thirteenth aspect, alone or in combination with one or more of the first through twelfth aspects, the resource allocation indicates one or more parameter values associated with one or more parameters of the pseudo-random number generator.

In a fourteenth aspect, alone or in combination with one or more of the first through thirteenth aspects, a density of the PRTs of the set of PRTs is based at least in part on: the one or more parameters of the pseudo-random number generator, available bandwidth resources, or a combination thereof.

In a fifteenth aspect, alone or in combination with one or more of the first through fourteenth aspects, the resource allocation is carried in at least one of: DCI, an RRC message, a MAC-CE, or a combination thereof.

In a sixteenth aspect, alone or in combination with one or more of the first through fifteenth aspects, the pseudo-random number generator includes at least one of a linear congruential generator, a Costas array, a maximum length sequence, a Gold sequence, a Golomb Ruler, or a combination thereof.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with the present disclosure. Example process 600 is an example where the base station (e.g., base station 110 and/or the like) performs operations associated with tone reservation for PAPR reduction.

As shown in FIG. 6, in some aspects, process 600 may include transmitting a resource allocation indicating a set of transmission tones comprising a set of data tones and a set of PRTs, wherein the set of data tones indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator (block 610). For example, the base station (e.g., using transmit processor 220, controller/processor 240, memory 242, and/or the like) may transmit a resource allocation indicating a set of transmission tones comprising a set of data tones and a set of PRTs, as described above. In some aspects, the set of data tones indicates locations for the set of data tones and locations for the set of PRTs within a particular bandwidth. In some aspects, the locations for the set of PRTs are arranged relative to the locations for the set of data tones according to a PRT sequence. In some aspects, the PRT sequence comprises a pseudo-random pattern generated using a pseudo-random number generator.

As further shown in FIG. 6, in some aspects, process 600 may include receiving a data transmission comprising a waveform based at least in part on the resource allocation (block 620). For example, the base station (e.g., using receive processor 238, controller/processor 240, memory 242, and/or the like) may receive a data transmission comprising a waveform based at least in part on the resource allocation, as described above.

Process 600 may include additional aspects, such as any single aspect or any combination of aspects described below and/or in connection with one or more other processes described elsewhere herein.

In a first aspect, the waveform is based at least in part on an inverse discrete Fourier transform of the set of transmission tones.

In a second aspect, alone or in combination with the first aspect, the waveform comprises a CP-OFDM waveform or a DFT-s-OFDM waveform.

In a third aspect, alone or in combination with one or more of the first and second aspects, the set of PRTs are selected such that a PAPR associated with the waveform satisfies a PAPR threshold.

In a fourth aspect, alone or in combination with one or more of the first through third aspects, the resource allocation indicates the PRT sequence by referencing a PRTT, wherein the PRTT indicates a plurality of PRT sequences.

In a fifth aspect, alone or in combination with one or more of the first through fourth aspects, the resource allocation indicates a set of RBs, and the PRT sequence is based at least in part on the PRTT and a quantity of RBs in the set of RBs.

In a sixth aspect, alone or in combination with one or more of the first through fifth aspects, the PRTT comprises a plurality of entries, and an entry of the plurality of entries comprises at least one of: the PRT sequence, one or more parameters of the pseudo-random number generator, or a combination thereof.

In a seventh aspect, alone or in combination with one or more of the first through sixth aspects, the plurality of entries indicate a plurality of pseudo-random sequences.

In an eighth aspect, alone or in combination with one or more of the first through seventh aspects, each entry of the plurality of entries corresponds to a respective pseudo-random sequence of the plurality of pseudo-random sequences, and indicates at least one of: an offset associated with the respective pseudo-random sequence, a length associated with the respective pseudo-random sequence, or a combination thereof.

In a ninth aspect, alone or in combination with one or more of the first through eighth aspects, each pseudo-random sequence of the plurality of pseudo-random sequences corresponds to at least one of: a set of RBs allocated in the resource allocation, a ratio of a quantity of PRTs in the set of PRTs to a quantity of data tones in the set of data tones, or a combination thereof.

In a tenth aspect, alone or in combination with one or more of the first through ninth aspects, the resource allocation indicates the PRT sequence by indicating the pseudo-random number generator for determining the PRT sequence.

In an eleventh aspect, alone or in combination with one or more of the first through tenth aspects, the pseudo-random number generator comprises a seed.

In a twelfth aspect, alone or in combination with one or more of the first through eleventh aspects, the resource allocation indicates the seed.

In a thirteenth aspect, alone or in combination with one or more of the first through twelfth aspects, the resource allocation indicates one or more parameter values associated with one or more parameters of the pseudo-random number generator.

In a fourteenth aspect, alone or in combination with one or more of the first through thirteenth aspects, a density of the PRTs of the set of PRTs is based at least in part on: the one or more parameters of the pseudo-random number generator, available bandwidth resources, or a combination thereof.

In a fifteenth aspect, alone or in combination with one or more of the first through fourteenth aspects, the resource allocation is carried in at least one of: DCI, an RRC message, a MAC-CE, or a combination thereof.

In a sixteenth aspect, alone or in combination with one or more of the first through fifteenth aspects, the pseudo-random number generator includes at least one of a linear congruential generator, a Costas array, a maximum length sequence, a Gold sequence, a Golomb Ruler, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with the present disclosure. Example process 700 is an example where the UE (e.g., UE 120 and/or the like) performs operations associated with tone reservation for PAPR reduction.

As shown in FIG. 7, in some aspects, process 700 may include receiving a resource allocation indicating a set of transmission tones comprising a set of data tones and a set of PRTs, wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones (block 710). For example, the UE (e.g., using receive processor 258, controller/processor 280, memory 282, and/or the like) may receive a resource allocation indicating a set of transmission tones comprising a set of data tones and a set of PRTs, as described above. In some aspects, the resource allocation indicates locations for the set of data tones and locations for the set of PRTs within a particular bandwidth. In some aspects, the locations for the set of PRTs are arranged relative to the locations for the set of data tones according to a PRT sequence. In some aspects, the PRT sequence comprises a plurality of contiguous PRTs of the set of PRTs arranged relative to a plurality of contiguous data tones of the set of data tones.

As further shown in FIG. 7, in some aspects, process 700 may include transmitting a data transmission using a waveform based at least in part on the resource allocation (block 720). For example, the UE (e.g., using transmit processor 264, controller/processor 280, memory 282, and/or the like) may transmit a data transmission using a waveform based at least in part on the resource allocation, as described above.

Process 700 may include additional aspects, such as any single aspect or any combination of aspects described below and/or in connection with one or more other processes described elsewhere herein.

In a first aspect, the resource allocation is carried in at least one of: DCI, an RRC message, a MAC-CE, or a combination thereof.

In a second aspect, alone or in combination with the first aspect, process 700 includes generating the waveform by determining an inverse discrete Fourier transform of the set of transmission tones.

In a third aspect, alone or in combination with one or more of the first and second aspects, the waveform comprises a CP-OFDM waveform or a DFT-s-OFDM waveform.

In a fourth aspect, alone or in combination with one or more of the first through third aspects, the set of PRTs are selected such that a PAPR associated with the waveform satisfies a PAPR threshold.

In a fifth aspect, alone or in combination with one or more of the first through fourth aspects, the plurality of contiguous PRTs comprises the set of PRTs, and the plurality of contiguous data tones comprises the set of data tones.

In a sixth aspect, alone or in combination with one or more of the first through fifth aspects, the plurality of contiguous PRTs are arranged on a first side of the set of data tones or a second side of the set of data tones.

In a seventh aspect, alone or in combination with one or more of the first through sixth aspects, the plurality of contiguous PRTs has a PRT group length, and the plurality of contiguous data tones has a data tone group length.

In an eighth aspect, alone or in combination with one or more of the first through seventh aspects, the resource allocation indicates at least one of: a location of the plurality of contiguous PRTs relative to a location of the plurality of contiguous data tones, the PRT group length, the data tone group length, or a combination thereof.

In a ninth aspect, alone or in combination with one or more of the first through eighth aspects, the PRT sequence comprises a frequency gap disposed between the plurality of contiguous PRTs and the plurality of contiguous data tones.

In a tenth aspect, alone or in combination with one or more of the first through ninth aspects, the frequency gap has a gap length corresponding to a frequency range.

In an eleventh aspect, alone or in combination with one or more of the first through tenth aspects, the resource allocation indicates at least one of: a location of the frequency gap relative to at least one of a location of the plurality of contiguous PRTs, a location of the plurality of contiguous data tones, or a combination thereof, the gap length, or a combination thereof.

In a twelfth aspect, alone or in combination with one or more of the first through eleventh aspects, the resource allocation indicates a plurality of RBs, and an initial RB of the plurality of RBs comprises a starting RB of the frequency gap.

In a thirteenth aspect, alone or in combination with one or more of the first through twelfth aspects, the set of PRTs comprises an additional plurality of contiguous PRTs, and the plurality of contiguous data tones comprises the set of data tones.

In a fourteenth aspect, alone or in combination with one or more of the first through thirteenth aspects, the plurality of contiguous PRTs is arranged on a first side of the plurality of contiguous data tones, and the additional plurality of contiguous PRTs is arranged on a second side of the plurality of contiguous data tones.

In a fifteenth aspect, alone or in combination with one or more of the first through fourteenth aspects, the plurality of contiguous PRTs has a first PRT group length, and the additional plurality of contiguous PRTs has a second PRT group length.

In a sixteenth aspect, alone or in combination with one or more of the first through fifteenth aspects, the first PRT group length is equal to the second PRT group length.

In a seventeenth aspect, alone or in combination with one or more of the first through sixteenth aspects, the first PRT group length is not equal to the second PRT group length.

In an eighteenth aspect, alone or in combination with one or more of the first through seventeenth aspects, the resource allocation indicates at least one of: a location of the plurality of contiguous PRTs relative to a location of the plurality of contiguous data tones, a location of the additional plurality of contiguous PRTs relative to the location of the plurality of contiguous data tones, the first PRT group length, the second PRT group length, or a combination thereof.

In a nineteenth aspect, alone or in combination with one or more of the first through eighteenth aspects, the PRT sequence comprises: a first frequency gap between the plurality of contiguous PRTs and the plurality of contiguous data tones, and a second frequency gap between the plurality of contiguous data tones and the additional plurality of contiguous PRTs.

In a twentieth aspect, alone or in combination with one or more of the first through nineteenth aspects, the first frequency gap has a first gap length corresponding to a first frequency range, and the second frequency gap has a second gap length corresponding to a second frequency range.

In a twenty-first aspect, alone or in combination with one or more of the first through twentieth aspects, the first gap length is equal to the second gap length.

In a twenty-second aspect, alone or in combination with one or more of the first through twenty-first aspects, the first gap length is not equal to the second gap length.

In a twenty-third aspect, alone or in combination with one or more of the first through twenty-second aspects, the resource allocation indicates at least one of: a location of the first frequency gap relative to at least one of a location of the plurality of contiguous PRTs, a location of the plurality of contiguous data tones, or a combination thereof, a location of the second frequency gap relative to at least one of a location of the additional plurality of contiguous PRTs, the location of the plurality of contiguous data tones, or a combination thereof, the first gap length, the second gap length, or a combination thereof.

In a twenty-fourth aspect, alone or in combination with one or more of the first through twenty-third aspects, the resource allocation indicates a plurality of RBs, and an initial RB of the plurality of RBs comprises a starting RB of the first frequency gap or a starting RB of the second frequency gap.

In a twenty-fifth aspect, alone or in combination with one or more of the first through twenty-fourth aspects, the set of data tones comprises an additional plurality of contiguous data tones, and the plurality of contiguous PRTs comprises the set of PRTs.

In a twenty-sixth aspect, alone or in combination with one or more of the first through twenty-fifth aspects, the plurality of contiguous data tones is arranged on a first side of the plurality of contiguous PRTs, and the additional plurality of contiguous data tones is arranged on a second side of the plurality of contiguous PRTs.

In a twenty-seventh aspect, alone or in combination with one or more of the first through twenty-sixth aspects, the plurality of contiguous data tones has a first data tone group length, and the additional plurality of contiguous data tones has a second data tone group length.

In a twenty-eighth aspect, alone or in combination with one or more of the first through twenty-seventh aspects, the first data tone group length is equal to the second data tone group length.

In a twenty-ninth aspect, alone or in combination with one or more of the first through twenty-eighth aspects, the first data tone group length is not equal to the second data tone group length.

In a thirtieth aspect, alone or in combination with one or more of the first through twenty-ninth aspects, the resource allocation indicates: a location of the plurality of contiguous data tones relative to a location of the plurality of contiguous PRTs, a location of the additional plurality of contiguous data tones relative to the location of the plurality of contiguous PRTs, the first data tone group length, the second data tone group length, or a combination thereof.

In a thirty-first aspect, alone or in combination with one or more of the first through thirtieth aspects, the PRT sequence comprises: a first frequency gap between the plurality of contiguous data tones and the plurality of contiguous PRTs, and a second frequency gap between the plurality of contiguous PRTs and the additional plurality of contiguous data tones.

In a thirty-second aspect, alone or in combination with one or more of the first through thirty-first aspects, the first frequency gap has a first gap length corresponding to a first frequency range, and the second frequency gap has a second gap length corresponding to a second frequency range.

In a thirty-third aspect, alone or in combination with one or more of the first through thirty-second aspects, the first gap length is equal to the second gap length.

In a thirty-fourth aspect, alone or in combination with one or more of the first through thirty-third aspects, the first gap length is not equal to the second gap length.

In a thirty-fifth aspect, alone or in combination with one or more of the first through thirty-fourth aspects, the resource allocation indicates: a location of the first frequency gap relative to at least one of a location of the plurality of contiguous data tones, a location of the plurality of contiguous PRTs, or a combination thereof, a location of the second frequency gap relative to at least one of a location of the additional plurality of contiguous data tones, the location of the plurality of contiguous PRTs, or a combination thereof, the first gap length, the second gap length, or a combination thereof.

In a thirty-sixth aspect, alone or in combination with one or more of the first through thirty-fifth aspects, the resource allocation indicates a plurality of RBs, and an initial RB of the plurality of RBs comprises a starting RB of the first frequency gap or a starting RB of the second frequency gap.

In a thirty-seventh aspect, alone or in combination with one or more of the first through thirty-sixth aspects, the resource allocation indicates the PRT sequence by referencing a PRTT.

In a thirty-eighth aspect, alone or in combination with one or more of the first through thirty-seventh aspects, the resource allocation indicates a set of RBs, and process 700 includes determining, using the PRTT, the PRT sequence based at least in part on a quantity of RBs in the set of RBs.

In a thirty-ninth aspect, alone or in combination with one or more of the first through thirty-eighth aspects, the PRTT comprises a plurality of entries, and an entry of the plurality of entries comprises at least one of: the PRT sequence, one or more parameters of a deterministic function for determining the PRT sequence, a starting index associated with the PRT sequence, an ending index associated with the PRT sequence, or a combination thereof.

In a fortieth aspect, alone or in combination with one or more of the first through thirty-ninth aspects, the resource allocation indicates the PRT sequence by indicating a deterministic function for determining the PRT sequence.

In a forty-first aspect, alone or in combination with one or more of the first through fortieth aspects, the deterministic function comprises one or more flexible parameters.

In a forty-second aspect, alone or in combination with one or more of the first through forty-first aspects, process 700 includes receiving an indication of one or more parameter values corresponding to the one or more flexible parameters.

In a forty-third aspect, alone or in combination with one or more of the first through forty-second aspects, the resource allocation indicates at least one of: a set of PRT resources corresponding to the set of PRTs, a set of data tone resources corresponding to the set of data tones, or a combination thereof.

In a forty-fourth aspect, alone or in combination with one or more of the first through forty-third aspects, the resource allocation indicates a plurality of RBs and at least one of: a location of the set of PRT resources relative to an initial RB of the plurality of RBs, a location of the set of data tone resources relative to the initial RB, or a combination thereof.

In a forty-fifth aspect, alone or in combination with one or more of the first through forty-fourth aspects, the resource allocation comprises a bit mask that indicates a location of each of one or more PRTs of the set of PRTs relative to a location of each of one or more data tones of the set of data tones.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
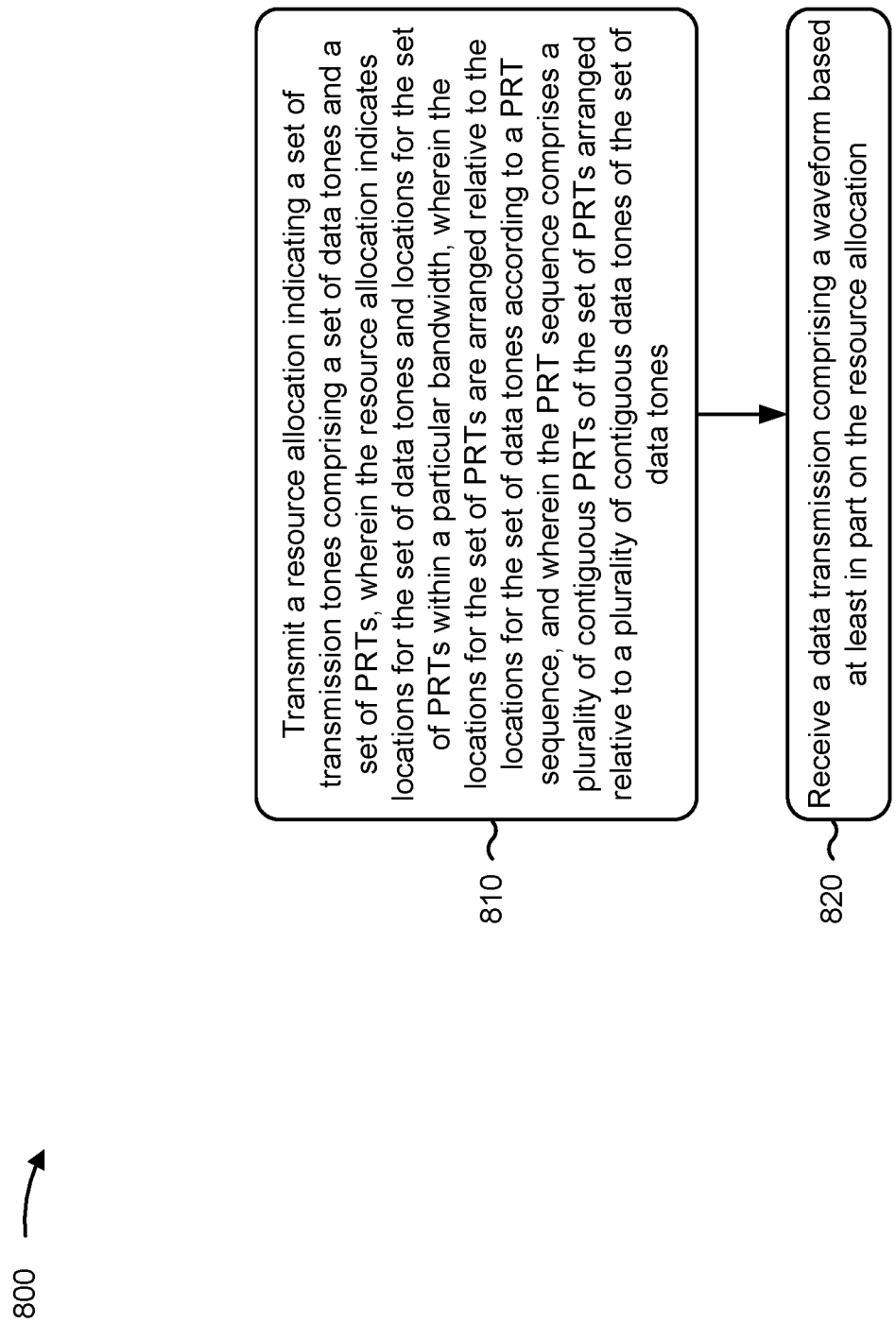
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with tone reservation for PAPR reduction.

As shown in FIG. 8, in some aspects, process 800 may include transmitting a resource allocation indicating a set of transmission tones comprising a set of data tones and a set of PRTs, wherein the resource allocation indicates locations for the set of data tones and locations for set of PRTs within a particular bandwidth, wherein the resource allocation indicates a set of PRT locations within the particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones (block 810). For example, the base station (e.g., using transmit processor 220, controller/processor 240, memory 242, and/or the like) may transmit a resource allocation indicating a set of transmission tones comprising a set of data tones and a set of PRTs, as described above. In some aspects, the resource allocation indicates locations for the set of data tones and locations for the set of PRTs within a particular bandwidth. In some aspects, the locations for the set of PRTs are arranged relative to the locations for the set of data tones according to a PRT sequence. In some aspects, the PRT sequence comprises a plurality of contiguous PRTs of the set of PRTs arranged relative to a plurality of contiguous data tones of the set of data tones.

As further shown in FIG. 8, in some aspects, process 800 may include receiving a data transmission comprising a waveform based at least in part on the resource allocation (block 820). For example, the base station (e.g., using receive processor 238, controller/processor 240, memory 242, and/or the like) may receive a data transmission comprising a waveform based at least in part on the resource allocation, as described above.

Process 800 may include additional aspects, such as any single aspect or any combination of aspects described below and/or in connection with one or more other processes described elsewhere herein.

In a first aspect, the resource allocation is carried in at least one of: DCI, an RRC message, a MAC-CE, or a combination thereof.

In a second aspect, alone or in combination with the first aspect, the waveform is based at least in part on an inverse discrete Fourier transform of the set of transmission tones.

In a third aspect, alone or in combination with one or more of the first and second aspects, the waveform comprises a CP-OFDM waveform or a DFT-s-OFDM waveform.

In a fourth aspect, alone or in combination with one or more of the first through third aspects, the set of PRTs are selected such that a PAPR associated with the waveform satisfies a PAPR threshold.

In a fifth aspect, alone or in combination with one or more of the first through fourth aspects, the plurality of contiguous PRTs comprises the set of PRTs, and the plurality of contiguous data tones comprises the set of data tones.

In a sixth aspect, alone or in combination with one or more of the first through fifth aspects, the plurality of contiguous PRTs are arranged on a first side of the set of data tones or a second side of the set of data tones.

In a seventh aspect, alone or in combination with one or more of the first through sixth aspects, the plurality of contiguous PRTs has a PRT group length, and the plurality of contiguous data tones has a data tone group length.

In an eighth aspect, alone or in combination with one or more of the first through seventh aspects, the resource allocation indicates at least one of: a location of the plurality of contiguous PRTs relative to a location of the plurality of contiguous data tones, the PRT group length, the data tone group length, or a combination thereof.

In a ninth aspect, alone or in combination with one or more of the first through eighth aspects, the PRT sequence comprises a frequency gap disposed between the plurality of contiguous PRTs and the plurality of contiguous data tones.

In a tenth aspect, alone or in combination with one or more of the first through ninth aspects, the frequency gap has a gap length corresponding to a frequency range.

In an eleventh aspect, alone or in combination with one or more of the first through tenth aspects, the resource allocation indicates at least one of: a location of the frequency gap relative to at least one of a location of the plurality of contiguous PRTs, a location of the plurality of contiguous data tones, or a combination thereof, the gap length, or a combination thereof.

In a twelfth aspect, alone or in combination with one or more of the first through eleventh aspects, the resource allocation indicates a plurality of RBs, and an initial RB of the plurality of RBs comprises a starting RB of the frequency gap.

In a thirteenth aspect, alone or in combination with one or more of the first through twelfth aspects, the set of PRTs comprises an additional plurality of contiguous PRTs, and the plurality of contiguous data tones comprises the set of data tones.

In a fourteenth aspect, alone or in combination with one or more of the first through thirteenth aspects, the plurality of contiguous PRTs is arranged on a first side of the plurality of contiguous data tones, and the additional plurality of contiguous PRTs is arranged on a second side of the plurality of contiguous data tones.

In a fifteenth aspect, alone or in combination with one or more of the first through fourteenth aspects, the plurality of contiguous PRTs has a first PRT group length, and the additional plurality of contiguous PRTs has a second PRT group length.

In a sixteenth aspect, alone or in combination with one or more of the first through fifteenth aspects, the first PRT group length is equal to the second PRT group length.

In a seventeenth aspect, alone or in combination with one or more of the first through sixteenth aspects, the first PRT group length is not equal to the second PRT group length.

In an eighteenth aspect, alone or in combination with one or more of the first through seventeenth aspects, the resource allocation indicates at least one of: a location of the plurality of contiguous PRTs relative to a location of the plurality of contiguous data tones, a location of the additional plurality of contiguous PRTs relative to the location of the plurality of contiguous data tones, the first PRT group length, the second PRT group length, or a combination thereof.

In a nineteenth aspect, alone or in combination with one or more of the first through eighteenth aspects, the PRT sequence comprises: a first frequency gap between the plurality of contiguous PRTs and the plurality of contiguous data tones, and a second frequency gap between the plurality of contiguous data tones and the additional plurality of contiguous PRTs.

In a twentieth aspect, alone or in combination with one or more of the first through nineteenth aspects, the first frequency gap has a first gap length corresponding to a first frequency range, and the second frequency gap has a second gap length corresponding to a second frequency range.

In a twenty-first aspect, alone or in combination with one or more of the first through twentieth aspects, the first gap length is equal to the second gap length.

In a twenty-second aspect, alone or in combination with one or more of the first through twenty-first aspects, the first gap length is not equal to the second gap length.

In a twenty-third aspect, alone or in combination with one or more of the first through twenty-second aspects, the resource allocation indicates at least one of: a location of the first frequency gap relative to at least one of a location of the plurality of contiguous PRTs, a location of the plurality of contiguous data tones, or a combination thereof, a location of the second frequency gap relative to at least one of a location of the additional plurality of contiguous PRTs, the location of the plurality of contiguous data tones, or a combination thereof, the first gap length, the second gap length, or a combination thereof.

In a twenty-fourth aspect, alone or in combination with one or more of the first through twenty-third aspects, the resource allocation indicates a plurality of RBs, and an initial RB of the plurality of RBs comprises a starting RB of the first frequency gap or a starting RB of the second frequency gap.

In a twenty-fifth aspect, alone or in combination with one or more of the first through twenty-fourth aspects, the set of data tones comprises an additional plurality of contiguous data tones, and the plurality of contiguous PRTs comprises the set of PRTs.

In a twenty-sixth aspect, alone or in combination with one or more of the first through twenty-fifth aspects, the plurality of contiguous data tones is arranged on a first side of the plurality of contiguous PRTs, and the additional plurality of contiguous data tones is arranged on a second side of the plurality of contiguous PRTs.

In a twenty-seventh aspect, alone or in combination with one or more of the first through twenty-sixth aspects, the plurality of contiguous data tones has a first data tone group length, and the additional plurality of contiguous data tones has a second data tone group length.

In a twenty-eighth aspect, alone or in combination with one or more of the first through twenty-seventh aspects, the first data tone group length is equal to the second data tone group length.

In a twenty-ninth aspect, alone or in combination with one or more of the first through twenty-eighth aspects, the first data tone group length is not equal to the second data tone group length.

In a thirtieth aspect, alone or in combination with one or more of the first through twenty-ninth aspects, the resource allocation indicates: a location of the plurality of contiguous data tones relative to a location of the plurality of contiguous PRTs, a location of the additional plurality of contiguous data tones relative to the location of the plurality of contiguous PRTs, the first data tone group length, the second data tone group length, or a combination thereof.

In a thirty-first aspect, alone or in combination with one or more of the first through thirtieth aspects, the PRT sequence comprises: a first frequency gap between the plurality of contiguous data tones and the plurality of contiguous PRTs, and a second frequency gap between the plurality of contiguous PRTs and the additional plurality of contiguous data tones.

In a thirty-second aspect, alone or in combination with one or more of the first through thirty-first aspects, the first frequency gap has a first gap length corresponding to a first frequency range, and the second frequency gap has a second gap length corresponding to a second frequency range.

In a thirty-third aspect, alone or in combination with one or more of the first through thirty-second aspects, the first gap length is equal to the second gap length.

In a thirty-fourth aspect, alone or in combination with one or more of the first through thirty-third aspects, the first gap length is not equal to the second gap length.

In a thirty-fifth aspect, alone or in combination with one or more of the first through thirty-fourth aspects, the resource allocation indicates: a location of the first frequency gap relative to at least one of a location of the plurality of contiguous data tones, a location of the plurality of contiguous PRTs, or a combination thereof, a location of the second frequency gap relative to at least one of a location of the additional plurality of contiguous data tones, the location of the plurality of contiguous PRTs, or a combination thereof, the first gap length, the second gap length, or a combination thereof.

In a thirty-sixth aspect, alone or in combination with one or more of the first through thirty-fifth aspects, the resource allocation indicates a plurality of RBs, and an initial RB of the plurality of RBs comprises a starting RB of the first frequency gap or a starting RB of the second frequency gap.

In a thirty-seventh aspect, alone or in combination with one or more of the first through thirty-sixth aspects, the resource allocation indicates the PRT sequence by referencing a PRTT.

In a thirty-eighth aspect, alone or in combination with one or more of the first through thirty-seventh aspects, the resource allocation indicates a set of RBs, and the PRT sequence is based at least in part on a quantity of RBs in the set of RBs.

In a thirty-ninth aspect, alone or in combination with one or more of the first through thirty-eighth aspects, the PRTT comprises a plurality of entries, and an entry of the plurality of entries comprises at least one of: the PRT sequence, one or more parameters of a deterministic function for determining the PRT sequence, a starting index associated with the PRT sequence, an ending index associated with the PRT sequence, or a combination thereof.

In a fortieth aspect, alone or in combination with one or more of the first through thirty-ninth aspects, the resource allocation indicates the PRT sequence by indicating a deterministic function for determining the PRT sequence.

In a forty-first aspect, alone or in combination with one or more of the first through fortieth aspects, the deterministic function comprises one or more flexible parameters.

In a forty-second aspect, alone or in combination with one or more of the first through forty-first aspects, process 800 includes transmitting an indication of one or more parameter values corresponding to the one or more flexible parameters.

In a forty-third aspect, alone or in combination with one or more of the first through forty-second aspects, the resource allocation indicates at least one of: a set of PRT resources corresponding to the set of PRTs, a set of data tone resources corresponding to the set of data tones, or a combination thereof.

In a forty-fourth aspect, alone or in combination with one or more of the first through forty-third aspects, the resource allocation indicates a plurality of RBs and at least one of: a location of the set of PRT resources relative to an initial RB of the plurality of RBs, a location of the set of data tone resources relative to the initial RB, or a combination thereof.

In a forty-fifth aspect, alone or in combination with one or more of the first through forty-fourth aspects, the resource allocation comprises a bit mask that indicates a location of each of one or more PRTs of the set of PRTs relative to a location of each of one or more data tones of the set of data tones.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and transmitting a data transmission using a waveform based at least in part on the resource allocation.

Aspect 2: The method of Aspect 1, wherein the pseudo-random number generator comprises at least one of: a linear congruential generator, a Costas array, a maximum length sequence, a Gold sequence, or a combination thereof.

Aspect 3: The method of either of Aspects 1 or 2, wherein the waveform comprises a cyclic prefix orthogonal frequency division multiplexing (OFDM) waveform or a discrete Fourier transform spread OFDM waveform.

Aspect 4: The method of any of Aspects 1-3, wherein the set of PRTs are selected such that a peak to average power ratio (PAPR) associated with the waveform satisfies a PAPR threshold.

Aspect 5: The method of any of Aspects 1-3, wherein the resource allocation indicates the PRT sequence by referencing a PRT table (PRTT), wherein the PRTT indicates a plurality of PRT sequences.

Aspect 6: The method of Aspect 5, wherein the resource allocation indicates a set of resource blocks (RBs), and the method further comprising determining, using the PRTT, the PRT sequence based at least in part on a quantity of RBs in the set of RBs.

Aspect 7: The method of either of Aspects 5 or 6, wherein the PRTT comprises a plurality of entries, wherein an entry of the plurality of entries comprises at least one of: the PRT sequence, one or more parameters of the pseudo-random number generator, or a combination thereof.

Aspect 8: The method of Aspect 7, wherein the plurality of entries indicate a plurality of pseudo-random sequences.

Aspect 9: The method of Aspect 8, wherein each entry of the plurality of entries corresponds to a respective pseudo-random sequence of the plurality of pseudo-random sequences, and indicates at least one of: an offset associated with the respective pseudo-random sequence, a length associated with the respective pseudo-random sequence, or a combination thereof.

Aspect 10: The method of either of Aspects 8 or 9, wherein each pseudo-random sequence of the plurality of pseudo-random sequences corresponds to at least one of: a set of resource blocks allocated to the UE, a ratio of a quantity of PRTs in the set of PRTs to a quantity of data tones in the set of data tones, or a combination thereof.

Aspect 11: The method of any of Aspects 1-10, wherein the resource allocation indicates the PRT sequence by indicating the pseudo-random number generator for determining the PRT sequence.

Aspect 12: The method of any of Aspects 1-11, wherein the pseudo-random number generator comprises a seed.

Aspect 13: The method of Aspect 12, wherein the resource allocation indicates the seed.

Aspect 14: The method of any of Aspects 1-13, wherein the resource allocation indicates one or more parameter values associated with one or more parameters of the pseudo-random number generator.

Aspect 15: The method of Aspect 14, wherein a density of the PRTs of the set of PRTs is based at least in part on: the one or more parameters of the pseudo-random number generator, available bandwidth resources, or a combination thereof.

Aspect 16: The method of any of Aspects 1-15, wherein the resource allocation is carried in at least one of: downlink control information, a radio resource control message, a medium access control control element, or a combination thereof.

Aspect 17: A method of wireless communication performed by a base station, comprising: transmitting a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and receiving a data transmission comprising a waveform based at least in part on the resource allocation.

Aspect 18: The method of Aspect 17, wherein the pseudo-random number generator comprises at least one of: a linear congruential generator, a Costas array, a maximum length sequence, a Gold sequence, or a combination thereof.

Aspect 19: The method of either of Aspects 17 or 18, wherein the waveform comprises a cyclic prefix orthogonal frequency division multiplexing (OFDM) waveform or a discrete Fourier transform spread OFDM waveform.

Aspect 20: The method of any of Aspects 17-19, wherein the set of PRTs are selected such that a peak to average power ratio (PAPR) associated with the waveform satisfies a PAPR threshold.

Aspect 21: The method of any of Aspects 17-20, wherein the resource allocation indicates the PRT sequence by referencing a PRT table (PRTT), wherein the PRTT indicates a plurality of PRT sequences.

Aspect 22: The method of Aspect 21, wherein the resource allocation indicates a set of resource blocks (RBs), and wherein the PRT sequence is based at least in part on the PRTT and a quantity of RBs in the set of RBs.

Aspect 23: The method of either of Aspects 21 or 22, wherein the PRTT comprises a plurality of entries, wherein an entry of the plurality of entries comprises at least one of: the PRT sequence, one or more parameters of the pseudo-random number generator, or a combination thereof.

Aspect 24: The method of Aspect 23, wherein the plurality of entries indicate a plurality of pseudo-random sequences.

Aspect 25: The method of Aspect 24, wherein each entry of the plurality of entries corresponds to a respective pseudo-random sequence of the plurality of pseudo-random sequences, and indicates at least one of: an offset associated with the respective pseudo-random sequence, a length associated with the respective pseudo-random sequence, or a combination thereof.

Aspect 26: The method of either of Aspects 24 or 25, wherein each pseudo-random sequence of the plurality of pseudo-random sequences corresponds to at least one of: a set of resource blocks allocated in the resource allocation, a ratio of a quantity of PRTs in the set of PRTs to a quantity of data tones in the set of data tones, or a combination thereof.

Aspect 27: The method of any of Aspects 17-26, wherein the resource allocation indicates the PRT sequence by indicating the pseudo-random number generator for determining the PRT sequence.

Aspect 28: The method of any of Aspects 17-27, wherein the pseudo-random number generator comprises a seed.

Aspect 29: The method of Aspect 28, wherein the resource allocation indicates the seed.

Aspect 30: The method of any of Aspects 17-29, wherein the resource allocation indicates one or more parameter values associated with one or more parameters of the pseudo-random number generator.

Aspect 31: The method of Aspect 30, wherein a density of the PRTs of the set of PRTs is based at least in part on: the one or more parameters of the pseudo-random number generator, available bandwidth resources, or a combination thereof.

Aspect 32: The method of any of Aspects 17-31, wherein the resource allocation is carried in at least one of: downlink control information, a radio resource control message, a medium access control control element, or a combination thereof.

Aspect 33: A method of wireless communication performed by a user equipment (UE), comprising: receiving a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and transmitting a data transmission using a waveform based at least in part on the resource allocation.

Aspect 34: The method of Aspect 33, wherein the resource allocation is carried in at least one of: downlink control information, a radio resource control message, a medium access control control element, or a combination thereof.

Aspect 35: The method of either of Aspects 33 or 34, further comprising generating the waveform by determining an inverse discrete Fourier transform of the set of transmission tones.

Aspect 36: The method of any of Aspects 33-35, wherein the waveform comprises a cyclic prefix orthogonal frequency division multiplexing (OFDM) waveform or a discrete Fourier transform spread OFDM waveform.

Aspect 37: The method of any of Aspects 33-36, wherein the set of PRTs are selected such that a peak to average power ratio (PAPR) associated with the waveform satisfies a PAPR threshold.

Aspect 38: The method of any of Aspects 33-37, wherein the plurality of contiguous PRTs comprises the set of PRTs, and the plurality of contiguous data tones comprises the set of data tones.

Aspect 39: The method of Aspect 38, wherein the plurality of contiguous PRTs are arranged on a first side of the set of data tones or a second side of the set of data tones.

Aspect 40: The method of any of Aspects 33-39, wherein the plurality of contiguous PRTs has a PRT group length, and wherein the plurality of contiguous data tones has a data tone group length.

Aspect 41: The method of Aspect 40, wherein the resource allocation indicates at least one of: a location of the plurality of contiguous PRTs relative to a location of the plurality of contiguous data tones, the PRT group length, the data tone group length, or a combination thereof.

Aspect 42: The method of any of Aspects 33-41, wherein the PRT sequence comprises a frequency gap disposed between the plurality of contiguous PRTs and the plurality of contiguous data tones.

Aspect 43: The method of Aspect 42, wherein the frequency gap has a gap length corresponding to a frequency range.

Aspect 44: The method of Aspect 43, wherein the resource allocation indicates at least one of: a location of the frequency gap relative to at least one of a location of the plurality of contiguous PRTs, a location of the plurality of contiguous data tones, or a combination thereof, the gap length, or a combination thereof.

Aspect 45: The method of Aspect 42, wherein the resource allocation indicates a plurality of resource blocks (RBs), and wherein an initial RB of the plurality of RBs comprises a starting RB of the frequency gap.

Aspect 46: The method of any of Aspects 33-45, wherein the set of PRTs comprises an additional plurality of contiguous PRTs, and wherein the plurality of contiguous data tones comprises the set of data tones.

Aspect 47: The method of Aspect 46, wherein the plurality of contiguous PRTs is arranged on a first side of the plurality of contiguous data tones, and wherein the additional plurality of contiguous PRTs is arranged on a second side of the plurality of contiguous data tones.

Aspect 48: The method of Aspect 47, wherein the plurality of contiguous PRTs has a first PRT group length, and wherein the additional plurality of contiguous PRTs has a second PRT group length.

Aspect 49: The method of Aspect 48, wherein the first PRT group length is equal to the second PRT group length.

Aspect 50: The method of Aspect 48, wherein the first PRT group length is not equal to the second PRT group length.

Aspect 51: The method of any of Aspects 48-50, wherein the resource allocation indicates at least one of: a location of the plurality of contiguous PRTs relative to a location of the plurality of contiguous data tones, a location of the additional plurality of contiguous PRTs relative to the location of the plurality of contiguous data tones, the first PRT group length, the second PRT group length, or a combination thereof.

Aspect 52: The method of any of Aspects 47-51, wherein the PRT sequence comprises: a first frequency gap between the plurality of contiguous PRTs and the plurality of contiguous data tones; and a second frequency gap between the plurality of contiguous data tones and the additional plurality of contiguous PRTs.

Aspect 53: The method of Aspect 52, wherein the first frequency gap has a first gap length corresponding to a first frequency range, and wherein the second frequency gap has a second gap length corresponding to a second frequency range.

Aspect 54: The method of Aspect 53, wherein the first gap length is equal to the second gap length.

Aspect 55: The method of Aspect 53, wherein the first gap length is not equal to the second gap length.

Aspect 56: The method of any of Aspects 53-55, wherein the resource allocation indicates at least one of: a location of the first frequency gap relative to at least one of a location of the plurality of contiguous PRTs, a location of the plurality of contiguous data tones, or a combination thereof, a location of the second frequency gap relative to at least one of a location of the additional plurality of contiguous PRTs, the location of the plurality of contiguous data tones, or a combination thereof, the first gap length, the second gap length, or a combination thereof.

Aspect 57: The method of any of Aspects 53-56, wherein the resource allocation indicates a plurality of resource blocks (RBs), and wherein an initial RB of the plurality of RBs comprises a starting RB of the first frequency gap or a starting RB of the second frequency gap.

Aspect 58: The method of any of Aspects 33-57, wherein the set of data tones comprises an additional plurality of contiguous data tones, and wherein the plurality of contiguous PRTs comprises the set of PRTs.

Aspect 59: The method of Aspect 58, wherein the plurality of contiguous data tones is arranged on a first side of the plurality of contiguous PRTs, and wherein the additional plurality of contiguous data tones is arranged on a second side of the plurality of contiguous PRTs.

Aspect 60: The method of Aspect 59, wherein the plurality of contiguous data tones has a first data tone group length, and wherein the additional plurality of contiguous data tones has a second data tone group length.

Aspect 61: The method of Aspect 60, wherein the first data tone group length is equal to the second data tone group length.

Aspect 62: The method of Aspect 60, wherein the first data tone group length is not equal to the second data tone group length.

Aspect 63: The method of any of Aspects 60-62, wherein the resource allocation indicates: a location of the plurality of contiguous data tones relative to a location of the plurality of contiguous PRTs, a location of the additional plurality of contiguous data tones relative to the location of the plurality of contiguous PRTs, the first data tone group length, the second data tone group length, or a combination thereof.

Aspect 64: The method of any of Aspects 59-63, wherein the PRT sequence comprises: a first frequency gap between the plurality of contiguous data tones and the plurality of contiguous PRTs; and a second frequency gap between the plurality of contiguous PRTs and the additional plurality of contiguous data tones.

Aspect 65: The method of Aspect 64, wherein the first frequency gap has a first gap length corresponding to a first frequency range, and wherein the second frequency gap has a second gap length corresponding to a second frequency range.

Aspect 66: The method of Aspect 65, wherein the first gap length is equal to the second gap length.

Aspect 67: The method of Aspect 65, wherein the first gap length is not equal to the second gap length.

Aspect 68: The method of any of Aspects 65-67, wherein the resource allocation indicates: a location of the first frequency gap relative to at least one of a location of the plurality of contiguous data tones, a location of the plurality of contiguous PRTs, or a combination thereof, a location of the second frequency gap relative to at least one of a location of the additional plurality of contiguous data tones, the location of the plurality of contiguous PRTs, or a combination thereof, the first gap length, the second gap length, or a combination thereof.

Aspect 69: The method of Aspect 64, wherein the resource allocation indicates a plurality of resource blocks (RBs), and wherein an initial RB of the plurality of RBs comprises a starting RB of the first frequency gap or a starting RB of the second frequency gap.

Aspect 70: The method of any of Aspects 33-69, wherein the resource allocation indicates the PRT sequence by referencing a PRT table (PRTT).

Aspect 71: The method of Aspect 70, wherein the resource allocation indicates a set of resource blocks (RBs), and the method further comprising determining, using the PRTT, the PRT sequence based at least in part on a quantity of RBs in the set of RBs.

Aspect 72: The method of Aspect 71, wherein the PRTT comprises a plurality of entries, wherein an entry of the plurality of entries comprises at least one of: the PRT sequence, one or more parameters of a deterministic function for determining the PRT sequence, a starting index associated with the PRT sequence, an ending index associated with the PRT sequence, or a combination thereof.

Aspect 73: The method of any of Aspects 33-72, wherein the resource allocation indicates the PRT sequence by indicating a deterministic function for determining the PRT sequence.

Aspect 74: The method of Aspect 73, wherein the deterministic function comprises one or more flexible parameters.

Aspect 75: The method of Aspect 74, further comprising receiving an indication of one or more parameter values corresponding to the one or more flexible parameters.

Aspect 76: The method of any of Aspects 33-75, wherein the resource allocation indicates at least one of: a set of PRT resources corresponding to the set of PRTs, a set of data tone resources corresponding to the set of data tones, or a combination thereof.

Aspect 77: The method of Aspect 76, wherein the resource allocation indicates a plurality of resource blocks (RBs) and at least one of: a location of the set of PRT resources relative to an initial RB of the plurality of RBs, a location of the set of data tone resources relative to the initial RB, or a combination thereof.

Aspect 78: The method of any of Aspects 33-77, wherein the resource allocation comprises a bit mask that indicates a location of each of one or more PRTs of the set of PRTs relative to a location of each of one or more data tones of the set of data tones.

Aspect 79: A method of wireless communication performed by a base station, comprising: transmitting a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and receiving a data transmission comprising a waveform based at least in part on the resource allocation.

Aspect 80: The method of Aspect 79, wherein the resource allocation is carried in at least one of: downlink control information, a radio resource control message, a medium access control control element, or a combination thereof.

Aspect 81: The method of either of Aspects 79 or 80, wherein the waveform is based at least in part on an inverse discrete Fourier transform of the set of transmission tones.

Aspect 82: The method of any of Aspects 79-81, wherein the waveform comprises a cyclic prefix orthogonal frequency division multiplexing (OFDM) waveform or a discrete Fourier transform spread OFDM waveform.

Aspect 83: The method of any of Aspects 79-82, wherein the set of PRTs are selected such that a peak to average power ratio (PAPR) associated with the waveform satisfies a PAPR threshold.

Aspect 84: The method of any of Aspects 79-83, wherein the plurality of contiguous PRTs comprises the set of PRTs, and the plurality of contiguous data tones comprises the set of data tones.

Aspect 85: The method of Aspect 84, wherein the plurality of contiguous PRTs are arranged on a first side of the set of data tones or a second side of the set of data tones.

Aspect 86: The method of either of Aspects 84 or 85, wherein the plurality of contiguous PRTs has a PRT group length, and wherein the plurality of contiguous data tones has a data tone group length.

Aspect 87: The method of Aspect 86, wherein the resource allocation indicates at least one of: a location of the plurality of contiguous PRTs relative to a location of the plurality of contiguous data tones, the PRT group length, the data tone group length, or a combination thereof.

Aspect 88: The method of any of Aspects 79-87, wherein the PRT sequence comprises a frequency gap disposed between the plurality of contiguous PRTs and the plurality of contiguous data tones.

Aspect 89: The method of Aspect 88, wherein the frequency gap has a gap length corresponding to a frequency range.

Aspect 90: The method of Aspect 89, wherein the resource allocation indicates at least one of: a location of the frequency gap relative to at least one of a location of the plurality of contiguous PRTs, a location of the plurality of contiguous data tones, or a combination thereof, the gap length, or a combination thereof.

Aspect 91: The method of either of Aspects 89 or 90, wherein the resource allocation indicates a plurality of resource blocks (RBs), and wherein an initial RB of the plurality of RBs comprises a starting RB of the frequency gap.

Aspect 92: The method of any of Aspects 79-91, wherein the set of PRTs comprises an additional plurality of contiguous PRTs, and wherein the plurality of contiguous data tones comprises the set of data tones.

Aspect 93: The method of Aspect 92, wherein the plurality of contiguous PRTs is arranged on a first side of the plurality of contiguous data tones, and wherein the additional plurality of contiguous PRTs is arranged on a second side of the plurality of contiguous data tones.

Aspect 94: The method of Aspect 93, wherein the plurality of contiguous PRTs has a first PRT group length, and wherein the additional plurality of contiguous PRTs has a second PRT group length.

Aspect 95: The method of Aspect 94, wherein the first PRT group length is equal to the second PRT group length.

Aspect 96: The method of Aspect 94, wherein the first PRT group length is not equal to the second PRT group length.

Aspect 97: The method of any of Aspects 94-96, wherein the resource allocation indicates at least one of: a location of the plurality of contiguous PRTs relative to a location of the plurality of contiguous data tones, a location of the additional plurality of contiguous PRTs relative to the location of the plurality of contiguous data tones, the first PRT group length, the second PRT group length, or a combination thereof.

Aspect 98: The method of any of Aspects 92-97, wherein the PRT sequence comprises: a first frequency gap between the plurality of contiguous PRTs and the plurality of contiguous data tones; and a second frequency gap between the plurality of contiguous data tones and the additional plurality of contiguous PRTs.

Aspect 99: The method of Aspect 98, wherein the first frequency gap has a first gap length corresponding to a first frequency range, and wherein the second frequency gap has a second gap length corresponding to a second frequency range.

Aspect 100: The method of Aspect 99, wherein the first gap length is equal to the second gap length.

Aspect 101: The method of Aspect 99, wherein the first gap length is not equal to the second gap length.

Aspect 102: The method of any of Aspects 99-101, wherein the resource allocation indicates at least one of: a location of the first frequency gap relative to at least one of a location of the plurality of contiguous PRTs, a location of the plurality of contiguous data tones, or a combination thereof, a location of the second frequency gap relative to at least one of a location of the additional plurality of contiguous PRTs, the location of the plurality of contiguous data tones, or a combination thereof, the first gap length, the second gap length, or a combination thereof.

Aspect 103: The method of any of Aspects 99-102, wherein the resource allocation indicates a plurality of resource blocks (RBs), and wherein an initial RB of the plurality of RBs comprises a starting RB of the first frequency gap or a starting RB of the second frequency gap.

Aspect 104: The method of any of Aspects 79-103, wherein the set of data tones comprises an additional plurality of contiguous data tones, and wherein the plurality of contiguous PRTs comprises the set of PRTs.

Aspect 105: The method of Aspect 104, wherein the plurality of contiguous data tones is arranged on a first side of the plurality of contiguous PRTs, and wherein the additional plurality of contiguous data tones is arranged on a second side of the plurality of contiguous PRTs.

Aspect 106: The method of Aspect 105, wherein the plurality of contiguous data tones has a first data tone group length, and wherein the additional plurality of contiguous data tones has a second data tone group length.

Aspect 107: The method of Aspect 106, wherein the first data tone group length is equal to the second data tone group length.

Aspect 108: The method of Aspect 106, wherein the first data tone group length is not equal to the second data tone group length.

Aspect 109: The method of any of Aspects 106-108, wherein the resource allocation indicates: a location of the plurality of contiguous data tones relative to a location of the plurality of contiguous PRTs, a location of the additional plurality of contiguous data tones relative to the location of the plurality of contiguous PRTs, the first data tone group length, the second data tone group length, or a combination thereof.

Aspect 110: The method of Aspect 109, wherein the PRT sequence comprises: a first frequency gap between the plurality of contiguous data tones and the plurality of contiguous PRTs; and a second frequency gap between the plurality of contiguous PRTs and the additional plurality of contiguous data tones.

Aspect 111: The method of Aspect 110, wherein the first frequency gap has a first gap length corresponding to a first frequency range, and wherein the second frequency gap has a second gap length corresponding to a second frequency range.

Aspect 112: The method of Aspect 111, wherein the first gap length is equal to the second gap length.

Aspect 113: The method of Aspect 111, wherein the first gap length is not equal to the second gap length.

Aspect 114: The method of any of Aspects 111-113, wherein the resource allocation indicates: a location of the first frequency gap relative to at least one of a location of the plurality of contiguous data tones, a location of the plurality of contiguous PRTs, or a combination thereof, a location of the second frequency gap relative to at least one of a location of the additional plurality of contiguous data tones, the location of the plurality of contiguous PRTs, or a combination thereof, the first gap length, the second gap length, or a combination thereof.

Aspect 115: The method of Aspect 114, wherein the resource allocation indicates a plurality of resource blocks (RBs), and wherein an initial RB of the plurality of RBs comprises a starting RB of the first frequency gap or a starting RB of the second frequency gap.

Aspect 116: The method of any of Aspects 79-115, wherein the resource allocation indicates the PRT sequence by referencing a PRT table (PRTT).

Aspect 117: The method of Aspect 116, wherein the resource allocation indicates a set of resource blocks (RBs), and wherein the PRT sequence is based at least in part on a quantity of RBs in the set of RBs.

Aspect 118: The method of Aspect 117, wherein the PRTT comprises a plurality of entries, wherein an entry of the plurality of entries comprises at least one of: the PRT sequence, one or more parameters of a deterministic function for determining the PRT sequence, a starting index associated with the PRT sequence, an ending index associated with the PRT sequence, or a combination thereof.

Aspect 119: The method of any of Aspects 79-118, wherein the resource allocation indicates the PRT sequence by indicating a deterministic function for determining the PRT sequence.

Aspect 120: The method of Aspect 119, wherein the deterministic function comprises one or more flexible parameters.

Aspect 121: The method of Aspect 120, further comprising transmitting an indication of one or more parameter values corresponding to the one or more flexible parameters.

Aspect 122: The method of any of Aspects 79-121, wherein the resource allocation indicates at least one of: a set of PRT resources corresponding to the set of PRTs, a set of data tone resources corresponding to the set of data tones, or a combination thereof.

Aspect 123: The method of Aspect 122, wherein the resource allocation indicates a plurality of resource blocks (RBs) and at least one of: a location of the set of PRT resources relative to an initial RB of the plurality of RBs, a location of the set of data tone resources relative to the initial RB, or a combination thereof.

Aspect 124: The method of any of Aspects 79-123, wherein the resource allocation comprises a bit mask that indicates a location of each of one or more PRTs of the set of PRTs relative to a location of each of one or more data tones of the set of data tones.

Aspect 125: An apparatus for wireless communication at a device, comprising a processor; memory coupled with the processor; and instructions stored in the memory and executable by the processor to cause the apparatus to perform the method of one or more Aspects of Aspects 1-16.

Aspect 126: A device for wireless communication, comprising a memory and one or more processors coupled to the memory, the memory and the one or more processors configured to perform the method of one or more Aspects of Aspects 1-16.

Aspect 127: An apparatus for wireless communication, comprising at least one means for performing the method of one or more Aspects of Aspects 1-16.

Aspect 128: A non-transitory computer-readable medium storing code for wireless communication, the code comprising instructions executable by a processor to perform the method of one or more Aspects of Aspects 1-16.

Aspect 129: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 130: An apparatus for wireless communication at a device, comprising a processor; memory coupled with the processor; and instructions stored in the memory and executable by the processor to cause the apparatus to perform the method of one or more Aspects of Aspects 17-32.

Aspect 131: A device for wireless communication, comprising a memory and one or more processors coupled to the memory, the memory and the one or more processors configured to perform the method of one or more Aspects of Aspects 17-32.

Aspect 132: An apparatus for wireless communication, comprising at least one means for performing the method of one or more Aspects of Aspects 17-32.

Aspect 133: A non-transitory computer-readable medium storing code for wireless communication, the code comprising instructions executable by a processor to perform the method of one or more Aspects of Aspects 17-32.

Aspect 134: A non-transitory computer-readable medium storing a set of instructions for wireless communication, the set of instructions comprising one or more instructions that, when executed by one or more processors of a device, cause the device to perform the method of one or more Aspects of Aspects 17-32.

Aspect 135: An apparatus for wireless communication at a device, comprising a processor; memory coupled with the processor; and instructions stored in the memory and executable by the processor to cause the apparatus to perform the method of one or more Aspects of Aspects 33-78.

Aspect 136: A device for wireless communication, comprising a memory and one or more processors coupled to the memory, the memory and the one or more processors configured to perform the method of one or more Aspects of Aspects 33-78.

Aspect 137: An apparatus for wireless communication, comprising at least one means for performing the method of one or more Aspects of Aspects 33-78.

Aspect 138: A non-transitory computer-readable medium storing code for wireless communication, the code comprising instructions executable by a processor to perform the method of one or more Aspects of Aspects 33-78.

Aspect 139: A non-transitory computer-readable medium storing a set of instructions for wireless communication, the set of instructions comprising one or more instructions that, when executed by one or more processors of a device, cause the device to perform the method of one or more Aspects of Aspects 33-78.

Aspect 140: An apparatus for wireless communication at a device, comprising a processor; memory coupled with the processor; and instructions stored in the memory and executable by the processor to cause the apparatus to perform the method of one or more Aspects of Aspects 79-124.

Aspect 141: A device for wireless communication, comprising a memory and one or more processors coupled to the memory, the memory and the one or more processors configured to perform the method of one or more Aspects of Aspects 79-124.

Aspect 142: An apparatus for wireless communication, comprising at least one means for performing the method of one or more Aspects of Aspects 79-124.

Aspect 143: A non-transitory computer-readable medium storing code for wireless communication, the code comprising instructions executable by a processor to perform the method of one or more Aspects of Aspects 79-124.

Aspect 144: A non-transitory computer-readable medium storing a set of instructions for wireless communication, the set of instructions comprising one or more instructions that, when executed by one or more processors of a device, cause the device to perform the method of one or more Aspects of Aspects 79-124.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the one or more processors are configured to:
      receive a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and
      transmit a data transmission using a waveform based at least in part on the resource allocation.

2. The UE of claim 1, wherein the pseudo-random number generator comprises at least one of:
   a linear congruential generator,
   a Costas array,
   a maximum length sequence,
   a Gold sequence, or
   a Golomb Ruler.

3. The UE of claim 1, wherein the set of PRTs are selected such that a peak to average power ratio (PAPR) associated with the waveform satisfies a PAPR threshold.

4. The UE of claim 1, wherein the resource allocation indicates the PRT sequence by referencing a PRT table (PRTT), wherein the PRTT indicates a plurality of PRT sequences.

5. The UE of claim 4, wherein the resource allocation indicates a set of resource blocks (RBs), and
   wherein the one or more processors are further configured to determine, using the PRTT, the PRT sequence based at least in part on a quantity of RBs in the set of RBs.

6. The UE of claim 4, wherein the PRTT comprises a plurality of entries, wherein an entry of the plurality of entries comprises at least one of:
   the PRT sequence, or
   one or more parameters of the pseudo-random number generator.

7. The UE of claim 6, wherein the plurality of entries indicate a plurality of pseudo-random sequences.

8. The UE of claim 7, wherein each entry of the plurality of entries corresponds to a respective pseudo-random sequence of the plurality of pseudo-random sequences, and indicates at least one of:
   an offset associated with the respective pseudo-random sequence, or
   a length associated with the respective pseudo-random sequence.

9. The UE of claim 7, wherein each pseudo-random sequence of the plurality of pseudo-random sequences corresponds to at least one of:
   a set of resource blocks allocated to the UE, or
   a ratio of a quantity of PRTs in the set of PRTs to a quantity of data tones in the set of data tones.

10. The UE of claim 1, wherein the resource allocation indicates at least one of:
    the PRT sequence by indicating the pseudo-random number generator for determining the PRT sequence, or
    one or more parameter values associated with one or more parameters of the pseudo-random number generator.

11. The UE of claim 1, wherein the pseudo-random number generator comprises a seed, wherein the resource allocation indicates the seed.

12. The UE of claim 11, wherein a density of the PRTs of the set of PRTs is based at least in part on:
    one or more parameters of the pseudo-random number generator,
    available bandwidth resources, or
    a combination thereof.

13. A UE for wireless communication, comprising:
    a memory; and
    one or more processors coupled to the memory, wherein the one or more processors are configured to:
       receive a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and
       transmit a data transmission using a waveform based at least in part on the resource allocation.

14. The UE of claim 13, wherein the plurality of contiguous PRTs comprises the set of PRTs, and the plurality of contiguous data tones comprises the set of data tones, and
    wherein the plurality of contiguous PRTs are arranged on a first side of the set of data tones along a frequency spectrum or a second side of the set of data tones along the frequency spectrum.

15. The UE of claim 13, wherein the plurality of contiguous PRTs has a PRT group length, wherein the plurality of contiguous data tones has a data tone group length, and wherein the resource allocation indicates at least one of:
    a location of the plurality of contiguous PRTs relative to a location of the plurality of contiguous data tones,
    the PRT group length, or
    the data tone group length.

16. The UE of claim 13, wherein the PRT sequence comprises a frequency gap disposed between the plurality of contiguous PRTs and the plurality of contiguous data tones, wherein the frequency gap has a gap length corresponding to a frequency range, and wherein the resource allocation indicates at least one of:
- a location of the frequency gap relative to at least one of a location of the plurality of contiguous PRTs, or a location of the plurality of contiguous data tones, or
- the gap length.

17. The UE of claim 16, wherein the resource allocation indicates a plurality of resource blocks (RBs), and wherein an initial RB of the plurality of RBs comprises a starting RB of the frequency gap.

18. The UE of claim 13, wherein the set of PRTs comprises an additional plurality of contiguous PRTs, wherein the plurality of contiguous data tones comprises the set of data tones, wherein the plurality of contiguous PRTs has a first PRT group length and is arranged on a first side of the plurality of contiguous data tones, wherein the additional plurality of contiguous PRTs has a second PRT group length and is arranged on a second side of the plurality of contiguous data tones, and wherein the resource allocation indicates at least one of:
- a location of the plurality of contiguous PRTs relative to a location of the plurality of contiguous data tones,
- a location of the additional plurality of contiguous PRTs relative to the location of the plurality of contiguous data tones,
- the first PRT group length, or
- the second PRT group length.

19. The UE of claim 18, wherein the PRT sequence comprises:
- a first frequency gap between the plurality of contiguous PRTs and the plurality of contiguous data tones, wherein the first frequency gap has a first gap length corresponding to a first frequency range; and
- a second frequency gap between the plurality of contiguous data tones and the additional plurality of contiguous PRTs, wherein the second frequency gap has a second gap length corresponding to a second frequency range, and wherein the resource allocation indicates at least one of:
  - a location of the first frequency gap relative to at least one of a location of the plurality of contiguous PRTs,
  - a location of the plurality of contiguous data tones,
  - a location of the second frequency gap relative to at least one of a location of the additional plurality of contiguous PRTs,
  - the location of the plurality of contiguous data tones,
  - the first gap length, or
  - the second gap length.

20. The UE of claim 19, wherein the resource allocation indicates a plurality of resource blocks (RBs), and wherein an initial RB of the plurality of RBs comprises a starting RB of the first frequency gap or a starting RB of the second frequency gap.

21. The UE of claim 13, wherein the set of data tones comprises an additional plurality of contiguous data tones, wherein the plurality of contiguous PRTs comprises the set of PRTs,
- wherein the plurality of contiguous data tones is arranged, along a frequency spectrum, on a first side of the plurality of contiguous PRTs, wherein the plurality of contiguous data tones has a first data tone group length, and
- wherein the additional plurality of contiguous data tones is arranged, along the frequency spectrum, on a second side of the plurality of contiguous PRTs, wherein the additional plurality of contiguous data tones has a second data tone group length, and wherein the resource allocation indicates at least one of:
  - a location of the plurality of contiguous data tones relative to a location of the plurality of contiguous PRTs,
  - a location of the additional plurality of contiguous data tones relative to the location of the plurality of contiguous PRTs,
  - the first data tone group length, or
  - the second data tone group length.

22. The UE of claim 21, wherein the PRT sequence comprises:
- a first frequency gap between the plurality of contiguous data tones and the plurality of contiguous PRTs, wherein the first frequency gap has a first gap length corresponding to a first frequency range; and
- a second frequency gap between the plurality of contiguous PRTs and the additional plurality of contiguous data tones, wherein the second frequency gap has a second gap length corresponding to a second frequency range, and wherein the resource allocation indicates at least one of:
  - a location of the first frequency gap relative to at least one of a location of the plurality of contiguous data tones,
  - a location of the plurality of contiguous PRTs,
  - a location of the second frequency gap relative to at least one of a location of the additional plurality of contiguous data tones,
  - the location of the plurality of contiguous PRTs,
  - the first gap length, or
  - the second gap length.

23. The UE of claim 22, wherein the resource allocation indicates a plurality of resource blocks (RBs), and wherein an initial RB of the plurality of RBs comprises a starting RB of the first frequency gap or a starting RB of the second frequency gap.

24. The UE of claim 13, wherein the resource allocation indicates the PRT sequence by referencing a PRT table (PRTT), wherein the resource allocation indicates a set of resource blocks (RBs), and
- wherein the one or more processors are further configured to to determine, using the PRTT, the PRT sequence based at least in part on a quantity of RBs in the set of RBs wherein the PRTT comprises a plurality of entries, and wherein an entry of the plurality of entries comprises at least one of:
  - the PRT sequence,
  - one or more parameters of a deterministic function for determining the PRT sequence,
  - a starting index associated with the PRT sequence, or
  - an ending index associated with the PRT sequence.

25. The UE of claim 13, wherein the resource allocation indicates the PRT sequence by indicating a deterministic function for determining the PRT sequence, wherein the deterministic function comprises one or more flexible parameters, and
- wherein the one or more processors are further configured to receive an indication of one or more parameter values corresponding to the one or more flexible parameters.

26. The UE of claim 13, wherein the resource allocation indicates at least one of:
   a set of PRT resources corresponding to the set of PRTs, or
   a set of data tone resources corresponding to the set of data tones.

27. The UE of claim 26, wherein the resource allocation indicates a plurality of resource blocks (RBs) and at least one of:
   a location of the set of PRT resources relative to an initial RB of the plurality of RBs, or
   a location of the set of data tone resources relative to the initial RB.

28. The UE of claim 13, wherein the resource allocation comprises a bit mask that indicates a location of each of one or more PRTs of the set of PRTs relative to a location of each of one or more data tones of the set of data tones.

29. A method of wireless communication performed by a user equipment (UE), comprising:
   receiving a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a pseudo-random pattern generated using a pseudo-random number generator; and
   transmitting a data transmission using a waveform based at least in part on the resource allocation.

30. A method of wireless communication performed by a user equipment (UE), comprising:
   receiving a resource allocation indicating a set of transmission tones comprising a set of data tones and a set of peak reduction tones (PRTs), wherein the resource allocation indicates locations for the set of data tones and locations for the set of PRTs within a particular bandwidth, wherein the locations for the set of PRTs are arranged relative to the locations for the set of data tones according to a PRT sequence, and wherein the PRT sequence comprises a plurality of contiguous PRTs of the set of PRTs arranged relative to a plurality of contiguous data tones of the set of data tones; and
   transmitting a data transmission using a waveform based at least in part on the resource allocation.

* * * * *